US008813864B2

(12) United States Patent
Layton

(10) Patent No.: US 8,813,864 B2
(45) Date of Patent: Aug. 26, 2014

(54) SUPPORT SYSTEM FOR A BOX BLADE ATTACHED TO A TRACTOR

(71) Applicant: Jack D. Layton, Salem, OR (US)

(72) Inventor: Jack D. Layton, Salem, OR (US)

(*) Notice: Subject to any disclaimer, the term of this patent is extended or adjusted under 35 U.S.C. 154(b) by 0 days.

(21) Appl. No.: 13/839,761

(22) Filed: Mar. 15, 2013

(65) Prior Publication Data
US 2013/0284466 A1 Oct. 31, 2013

Related U.S. Application Data

(63) Continuation-in-part of application No. 13/229,533, filed on Sep. 9, 2011, now abandoned.

(51) Int. Cl.
A01B 49/00 (2006.01)
E02F 3/815 (2006.01)
E02F 3/76 (2006.01)
A01B 63/02 (2006.01)
E01C 23/082 (2006.01)
E02F 9/02 (2006.01)
A01B 63/00 (2006.01)
E02F 3/84 (2006.01)
A01B 31/00 (2006.01)

(52) U.S. Cl.
CPC ............ E02F 3/84 (2013.01); E02F 3/8155 (2013.01); E02F 3/7604 (2013.01); A01B 63/02 (2013.01); E01C 23/082 (2013.01); E02F 9/024 (2013.01); A01B 63/004 (2013.01); E02F 3/7677 (2013.01); E02F 3/7668 (2013.01); A01B 31/00 (2013.01)
USPC .......................................... 172/311

(58) Field of Classification Search
USPC ................. 172/311, 395, 507, 669; 239/167; 280/6.156, 412
See application file for complete search history.

(56) References Cited

U.S. PATENT DOCUMENTS

| | | |
|---|---|---|
| 2,065,397 A | 12/1936 | Ronning |
| 2,498,044 A | 2/1950 | Le Tourneau |
| 2,508,080 A | 5/1950 | Stumpf |
| 2,616,193 A | 11/1952 | Toepfer et al. |
| 2,635,888 A | 4/1953 | Bailiff |
| 3,027,662 A | 4/1962 | Cunningham, Jr. |
| 3,172,480 A | 3/1965 | Bemis |
| 3,237,539 A | 3/1966 | Layton |

(Continued)

FOREIGN PATENT DOCUMENTS

| | | |
|---|---|---|
| DE | 2135573 A1 | 1/1973 |
| EP | 0278679 B1 | 3/1992 |
| EP | 0352036 B1 | 2/1993 |
| FR | 2673592 A1 | 9/1992 |

OTHER PUBLICATIONS

U.S. Patent and Trademark Office; Office Action regarding U.S. Appl. No. 13/229,533; mailing date Oct. 22, 2012; 5 pages.

(Continued)

Primary Examiner — Árpád Fábián-Kovács
(74) Attorney, Agent, or Firm — Kolisch Hartwell, PC

(57) ABSTRACT

A support system for a box blade attached to a tractor. The support system includes a rear mounted frame supporting a box blade assembly and, optionally a scarifier. The box blade assembly may be pivotable around a substantially horizontal axis extending through the center of the tractor. The support system further includes trailing wheels that are pivotally attached to the frame and selectively laterally displaceable with respect to the horizontal axis.

23 Claims, 20 Drawing Sheets

(56) References Cited

U.S. PATENT DOCUMENTS

| | | | | |
|---|---|---|---|---|
| 3,275,342 | A | 9/1966 | Layton | |
| 3,286,606 | A | 11/1966 | Layton | |
| 3,286,636 | A | 11/1966 | Schaub | |
| 3,288,041 | A | 11/1966 | Layton | |
| 3,298,291 | A | 1/1967 | Layton | |
| 3,300,234 | A | 1/1967 | Layton | |
| 3,304,101 | A | 2/1967 | Layton | |
| 3,306,390 | A | 2/1967 | Jamme | |
| 3,330,188 | A | 7/1967 | Layton | |
| 3,338,143 | A | 8/1967 | Layton | |
| 3,396,481 | A | 8/1968 | Hovorak | |
| 3,409,311 | A | 11/1968 | Layton | |
| 3,435,546 | A | 4/1969 | Iverson | |
| 3,490,539 | A | 1/1970 | Hilmes | |
| 3,494,539 | A | 2/1970 | Littleford | |
| 3,515,411 | A | 6/1970 | Layton | |
| 3,545,033 | A * | 12/1970 | Couser | 16/370 |
| 3,611,594 | A | 10/1971 | Blackman | |
| 3,648,871 | A | 3/1972 | Layton | |
| 3,704,754 | A | 12/1972 | Layton | |
| 3,716,105 | A | 2/1973 | Hallam | |
| 3,738,682 | A * | 6/1973 | Ritter | 280/413 |
| 3,751,174 | A | 8/1973 | Layton | |
| 3,776,318 | A | 12/1973 | Layton | |
| 3,777,823 | A | 12/1973 | Holfeld | |
| 3,779,581 | A | 12/1973 | Scheuerpflug | |
| 3,787,135 | A | 1/1974 | Layton | |
| 3,820,497 | A * | 6/1974 | Konijn | 40/12.5 |
| 3,853,330 | A * | 12/1974 | Hanaoka | 280/99 |
| 3,899,037 | A | 8/1975 | Yuker | |
| 3,946,681 | A | 3/1976 | Sylvester | |
| 4,009,967 | A | 3/1977 | Layton | |
| 4,042,045 | A * | 8/1977 | Hake | 172/311 |
| 4,055,222 | A | 10/1977 | Runte | |
| 4,189,009 | A | 2/1980 | Welch | |
| 4,217,962 | A | 8/1980 | Schaefer | |
| 4,240,216 | A | 12/1980 | Martel | |
| 4,241,803 | A * | 12/1980 | Lauber | 180/8.1 |
| 4,395,191 | A * | 7/1983 | Kaiser | 414/694 |
| 4,398,363 | A | 8/1983 | Miskin | |
| 4,411,323 | A | 10/1983 | Doss | |
| 4,490,929 | A | 1/1985 | Lucas | |
| 4,506,609 | A * | 3/1985 | Fuss et al. | 111/136 |
| 4,526,238 | A | 7/1985 | Williams | |
| 4,718,790 | A | 1/1988 | Layton | |
| 4,802,293 | A | 2/1989 | Smith | |
| 4,848,012 | A | 7/1989 | Zimmerman | |
| 4,859,113 | A | 8/1989 | Layton | |
| 4,898,247 | A | 2/1990 | Springfield | |
| 4,930,582 | A | 6/1990 | Goss | |
| 4,944,355 | A * | 7/1990 | Karchewski | 172/278 |
| 5,009,546 | A | 4/1991 | Domenighetti et al. | |
| 5,154,240 | A * | 10/1992 | Carrick | 172/311 |
| 5,285,704 | A * | 2/1994 | Santana Gonzalez | 81/484 |
| 5,289,880 | A | 3/1994 | Barto | |
| 5,535,832 | A | 7/1996 | Benoit | |
| 5,794,714 | A | 8/1998 | Brown | |
| 5,833,012 | A | 11/1998 | Pierce et al. | |
| 5,890,546 | A | 4/1999 | Kerpash, Sr. | |
| 6,032,746 | A | 3/2000 | Lowery | |
| 6,112,828 | A | 9/2000 | Leal | |
| 6,199,769 | B1 | 3/2001 | Weddle | |
| 6,206,106 | B1 | 3/2001 | Heckendorf | |
| 6,206,125 | B1 | 3/2001 | Weddle | |
| 6,213,218 | B1 | 4/2001 | Miller | |
| 6,299,181 | B1 * | 10/2001 | Ericksson | 280/6.156 |
| 6,308,785 | B1 | 10/2001 | Rhoden | |
| 6,352,126 | B1 | 3/2002 | Brown | |
| 6,360,827 | B1 | 3/2002 | Clary | |
| 6,386,554 | B1 * | 5/2002 | Weddle | 280/6.154 |
| 6,389,345 | B2 | 5/2002 | Phelps | |
| 6,672,401 | B1 | 1/2004 | Crowley, II | |
| 6,739,404 | B2 | 5/2004 | Keigley | |
| 6,745,849 | B2 * | 6/2004 | Guiet | 172/669 |
| 6,789,629 | B1 | 9/2004 | Jones | |
| 6,827,176 | B2 | 12/2004 | Bean et al. | |
| 6,840,334 | B2 | 1/2005 | Marquardt | |
| 6,904,979 | B1 | 6/2005 | Confoey | |
| 7,033,105 | B2 | 4/2006 | Catenacci et al. | |
| 7,255,512 | B2 | 8/2007 | Wallace | |
| D552,630 | S | 10/2007 | Garrison et al. | |
| 7,425,004 | B2 * | 9/2008 | Donaldson | 280/6.156 |
| 7,575,067 | B1 | 8/2009 | Reyes | |
| 7,584,805 | B2 | 9/2009 | Skaggs | |
| 7,600,576 | B2 | 10/2009 | Gayer | |
| 7,793,738 | B2 | 9/2010 | Frederick | |
| 7,841,802 | B2 * | 11/2010 | Fockersperger, Jr. | 405/180 |
| 7,900,382 | B2 | 3/2011 | Wood | |
| 7,926,583 | B2 | 4/2011 | Newnam | |
| 8,109,531 | B2 | 2/2012 | Priepke et al. | |
| 8,127,861 | B2 * | 3/2012 | Meek | 172/311 |
| 2004/0129491 | A1 | 7/2004 | Bean et al. | |
| 2010/0044980 | A1 | 2/2010 | Kremmin et al. | |
| 2010/0075727 | A1 | 3/2010 | Coers et al. | |
| 2011/0079977 | A1 | 4/2011 | Geiger et al. | |
| 2011/0089647 | A1 | 4/2011 | Peterson et al. | |
| 2011/0100657 | A1 | 5/2011 | Connors et al. | |
| 2011/0148053 | A1 | 6/2011 | Motebennur et al. | |

OTHER PUBLICATIONS

U.S. Patent and Trademark Office; Office Action regarding U.S. Appl. No. 13/229,533 mailing date Mar. 19, 2013; 10 pages.

* cited by examiner

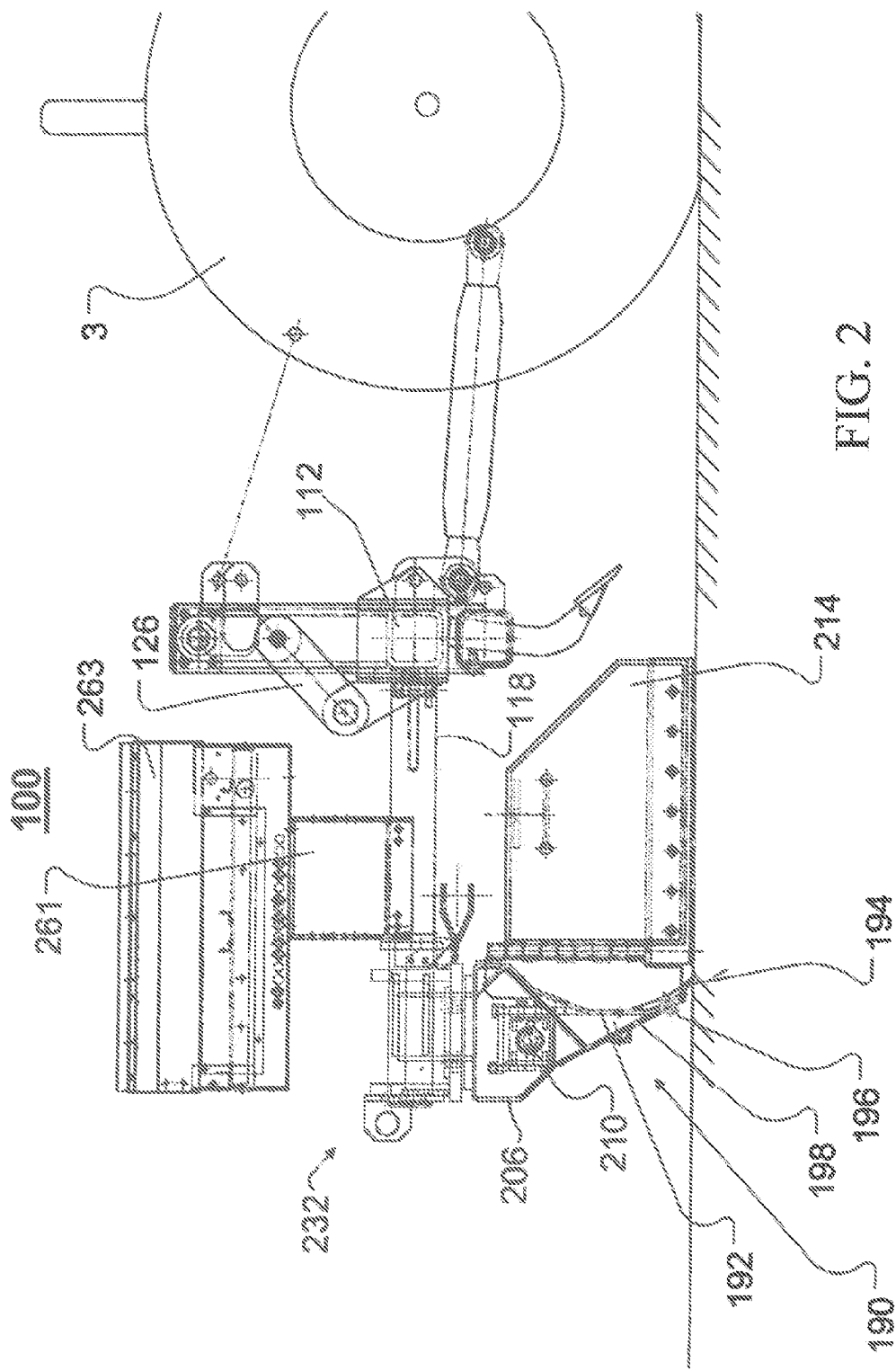

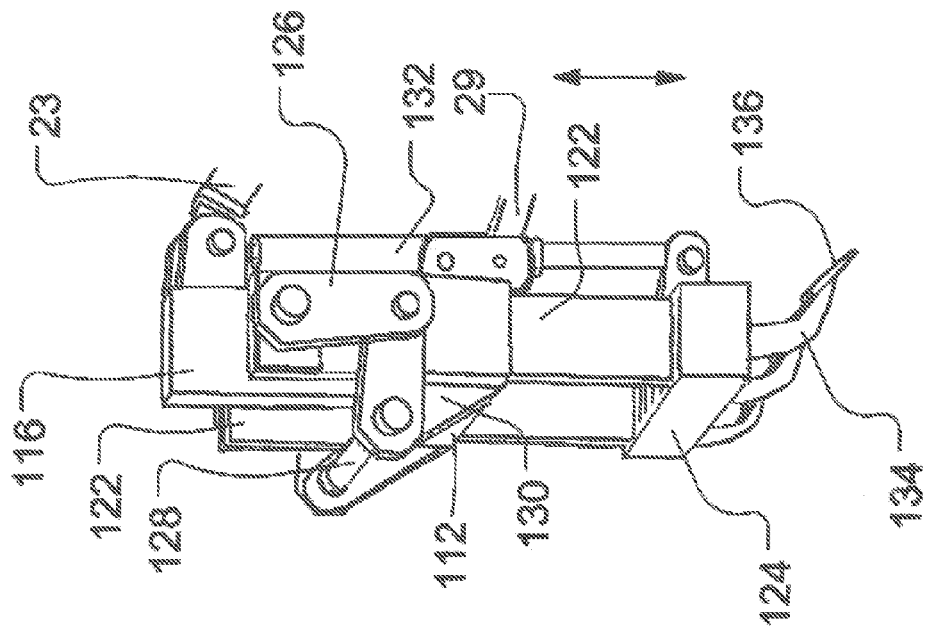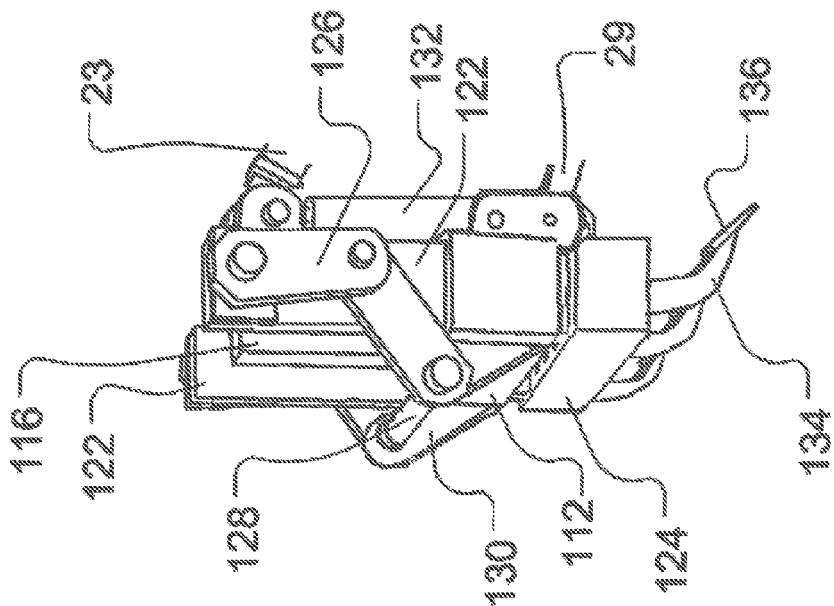
FIG. 4

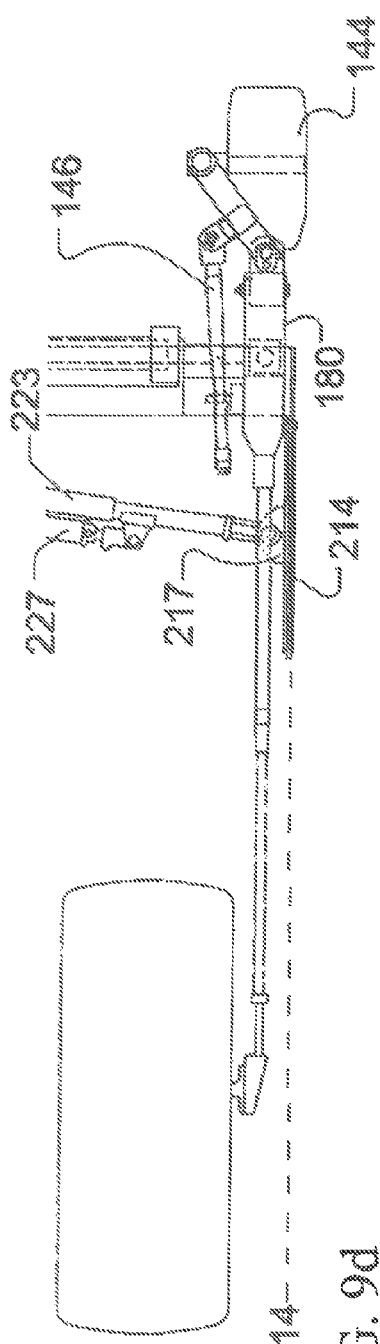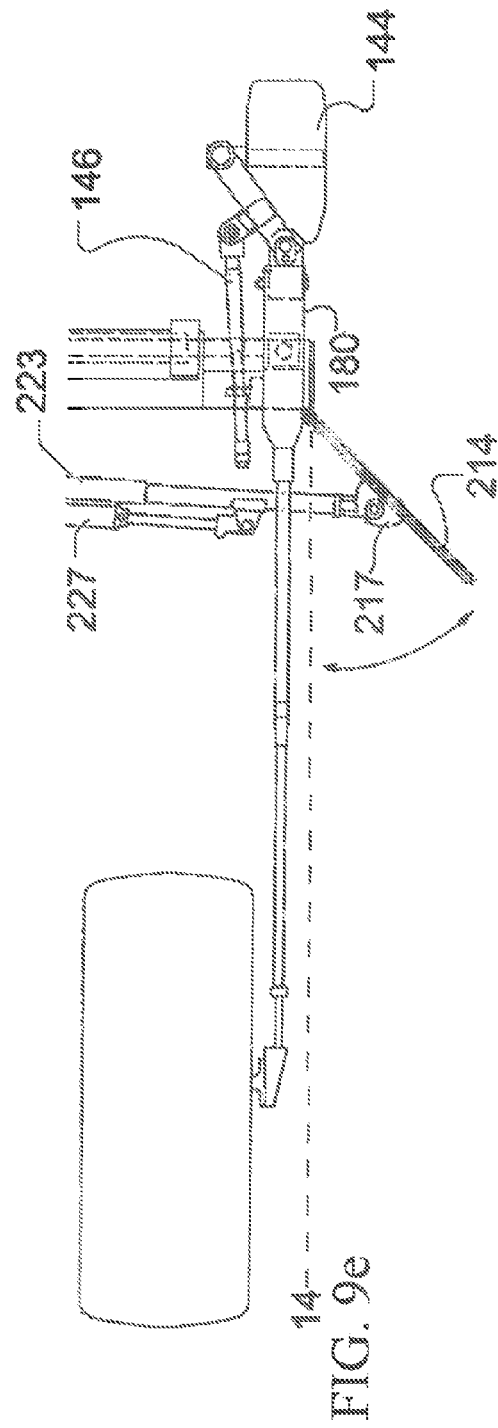

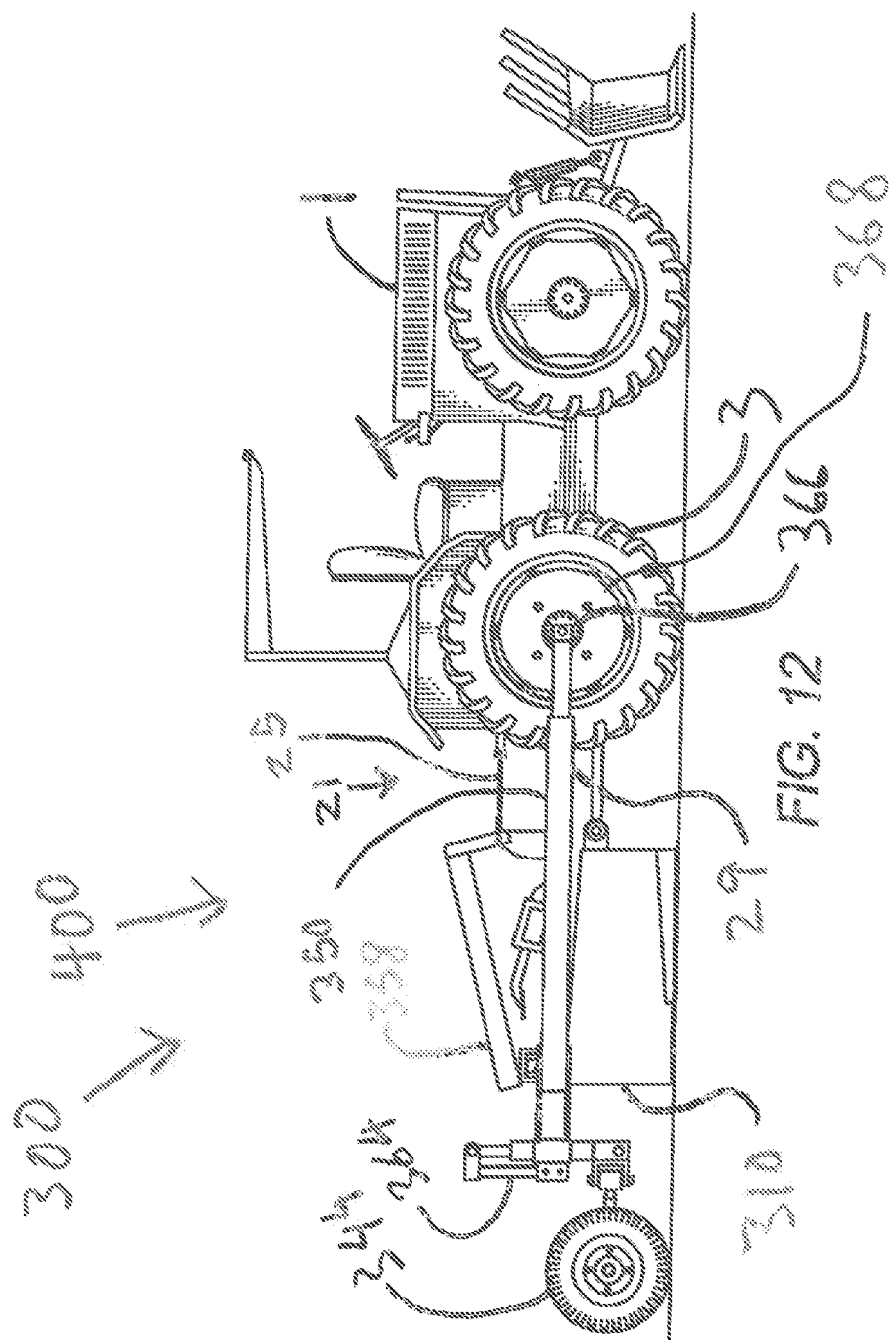

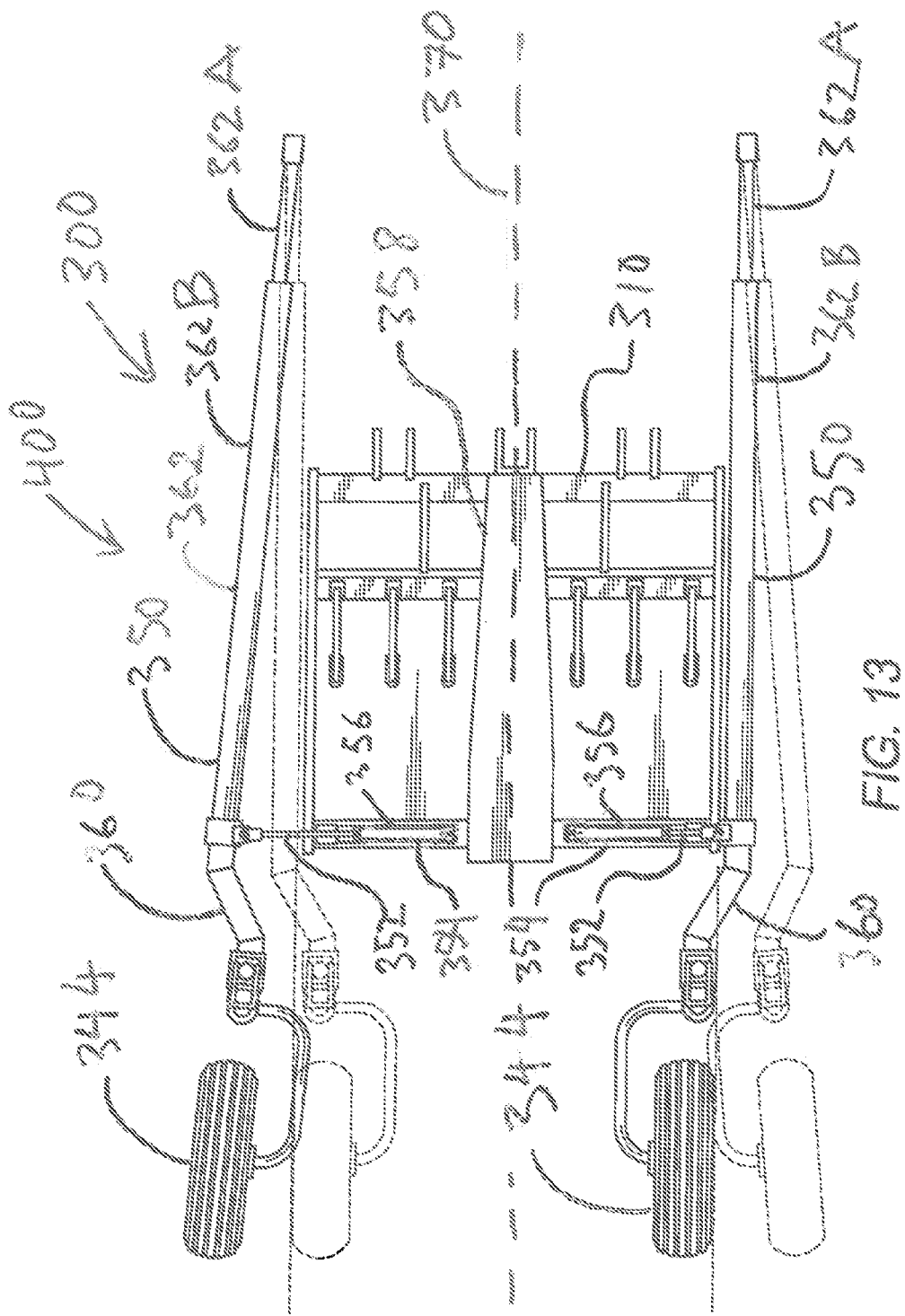

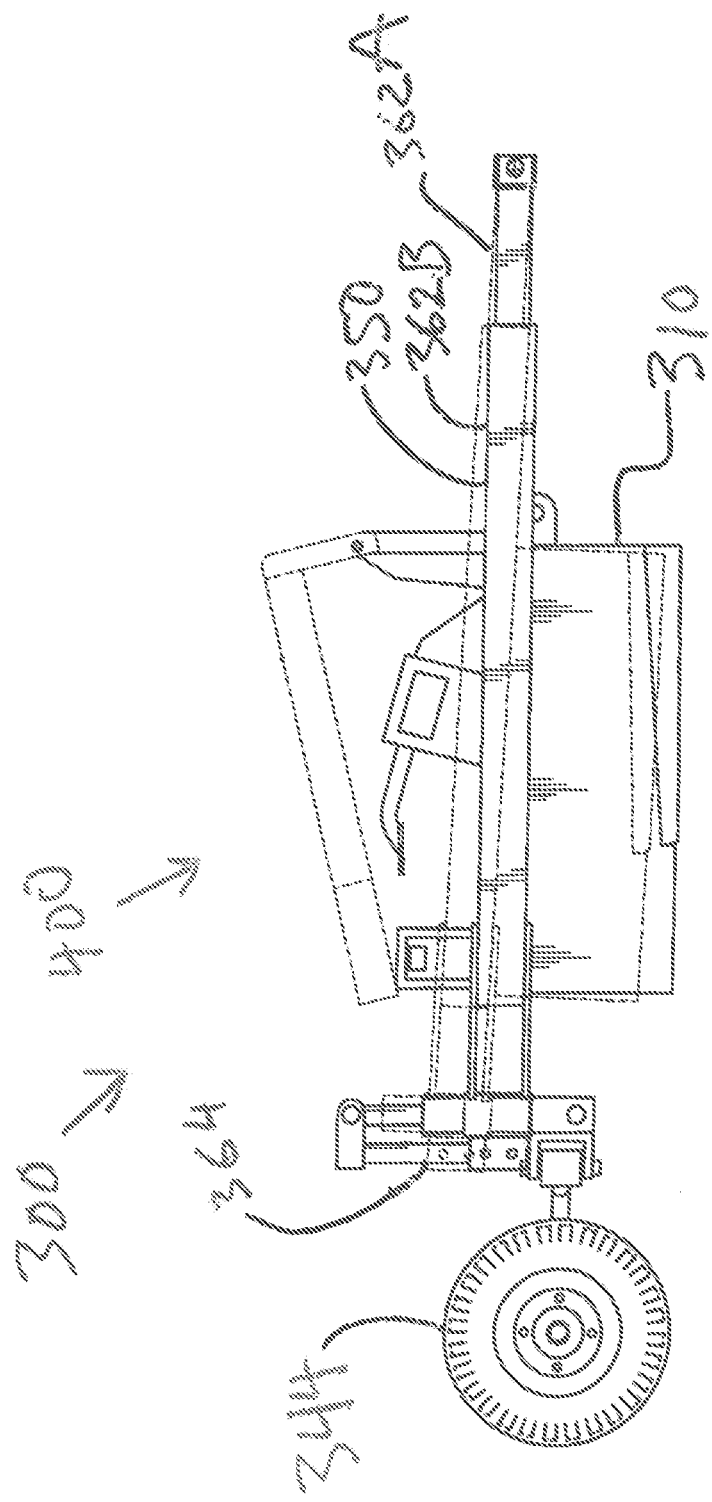

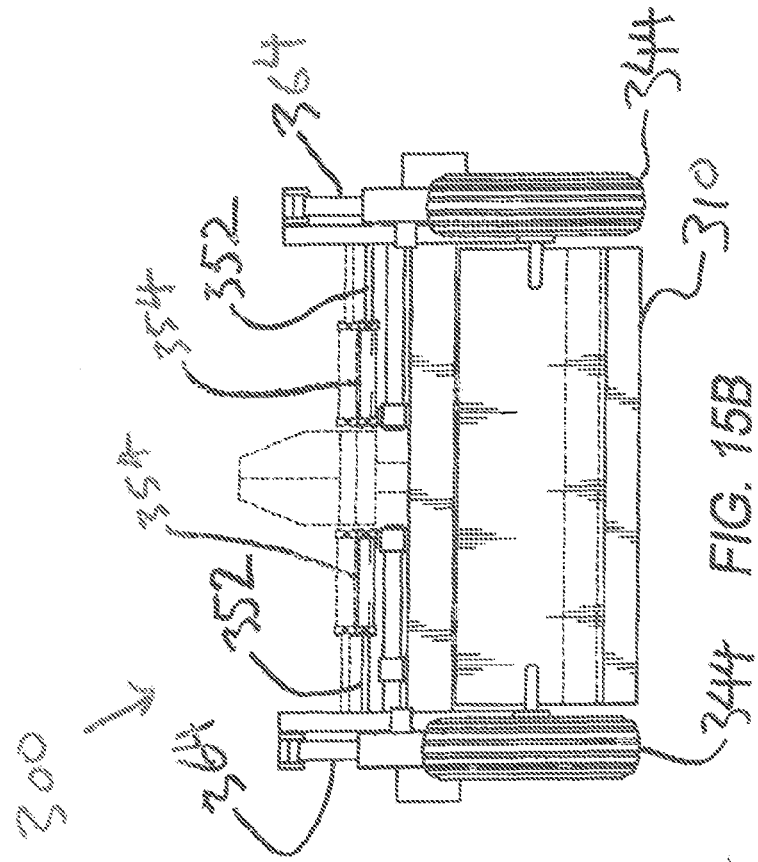
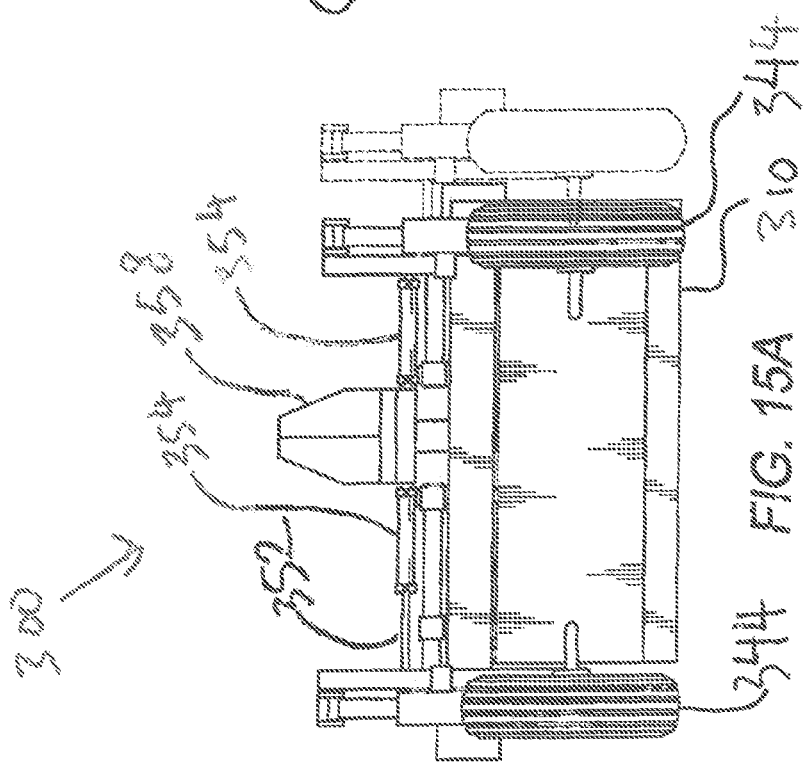

ic field to the field of graders, scarifi-

SUPPORT SYSTEM FOR A BOX BLADE ATTACHED TO A TRACTOR

CROSS-REFERENCE TO RELATED APPLICATIONS

This application is a continuation-in-part of U.S. patent application Ser. No. 13/229,533 and entitled SYSTEMS AND APPARATUSES FOR RESHAPING GROUND SURFACES, the disclosure of which is incorporated herein by reference.

TECHNICAL FIELD

Embodiments herein relate to the field of graders, scarifiers, and other apparatuses for construction of roads and other ground surfaces.

BACKGROUND

A variety of machines are used in the construction industry for site aggregate placement on large jobs such as highways, county roads, streets, and large parking areas. Examples of such machines and devices include motor graders, skip loaders with rear boxes, skid steer machines, crawler dozers, excavators, and others. However, these machines have limited utility for smaller jobs that require fast and accurate finishing of rock aggregate. As a consequence, manual labor is still required for such tasks in confined areas, modern parking facilities, and in other areas with obstructions such as planters, curbs, and sidewalks. In addition, the operation of these machines and devices typically requires substantial training and experience.

BRIEF DESCRIPTION OF THE DRAWINGS

Embodiments will be readily understood by the following detailed description in conjunction with the accompanying drawings. Embodiments are illustrated by way of example and not by way of limitation in the accompanying drawings.

FIG. 2 is a side view of the rear mounted grader apparatus of FIG. 1.

FIGS. 3b and 3c are plan views of the inner frame assembly and outer frame assembly, respectively, of the rear mounted grader apparatus of FIGS. 1-3a.

FIG. 4 depicts two perspective views of the scarifier depicted in FIGS. 1-2, in lowered and raised positions, respectively.

FIGS. 9d and 9e are plan views illustrating the angle adjustment of an end plate on the rear mounted grader apparatus of FIGS. 1-8.

FIG. 12 is a side view of a tractor and an example of an attachment assembly for a box blade assembly in accordance with the present invention.

FIG. 13 is a top view of the attachment assembly of FIG. 12 showing horizontal supports with an interconnected box blade assembly and illustrating a horizontal motion of the horizontal supports in relation to the box blade assembly.

FIG. 14 is a side view of the attachment assembly of FIG. 12 with an interconnected box blade assembly and illustrating a vertical motion of the horizontal support via activation of a vertical actuator.

FIG. 15A is a rear view of the attachment assembly of FIG. 12 illustrating a horizontal motion of a horizontal support and associated trailing wheel.

FIG. 15B is rear view of the attachment assembly of FIG. 12 illustrating a vertical motion of the box blade assembly via activation of a vertical actuator.

DETAILED DESCRIPTION OF DISCLOSED EMBODIMENTS

Figure 1:
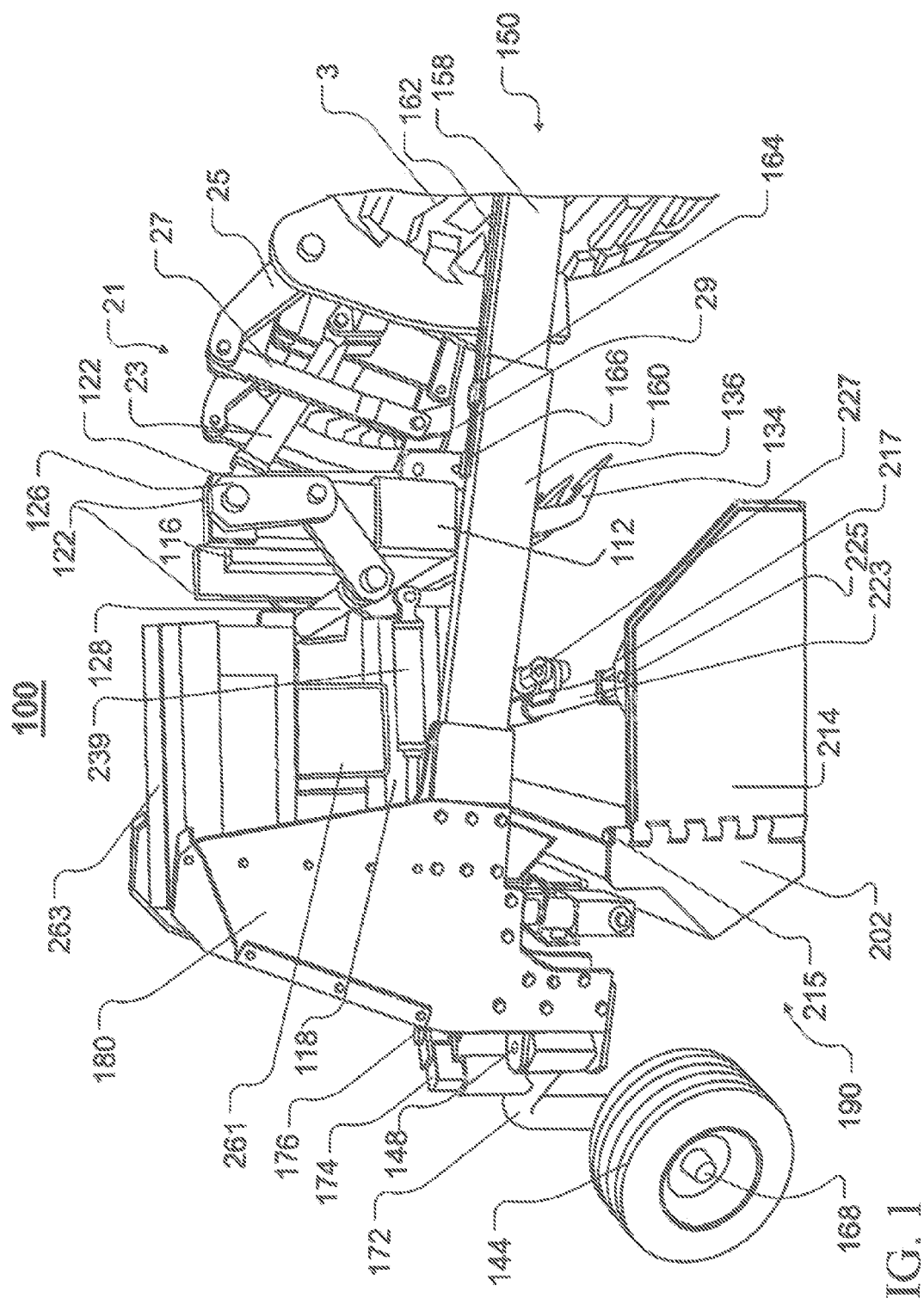
FIG. 1 is a perspective view of a rear mounted grader apparatus with a scarifier in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Various components, and sides/surfaces thereof, may be described as "proximal" or "distal" to one or more points or planes of reference. Unless otherwise specified, the terms "proximal" and "distal" are used to describe the location and/or orientation of components or sides/surfaces thereof) in relation to a motor vehicle coupled to the apparatus, a hitch coupled to the motor vehicle, or an apparatus component that is configured to be coupled thereto. Likewise, the "front" or "front end" of the apparatus refers to those portions of the apparatus that is configured to be coupled to the motor vehicle and/or hitch, and the "rear," "posterior," or "back end" refers to those portions of the apparatus that are most distal to the "front" or "front end." Thus, unless otherwise specified, a "proximal" surface/side of a component is closer to the motor vehicle, hitch, or frame member than a "distal" surface/side of that component. Other points or planes of reference, such as a vertical axis or a horizontal axis, may instead be used to describe components, or sides/surfaces thereof, as "proximal" and "distal" to those other points or planes of reference where specifically indicated.

The terms "vertical," "horizontal," and derivative terms thereof, may be used in reference to one or more components and/or points or planes of reference. Where such terms are used to describe components of an apparatus, they are used in reference to the positions/orientations of the components while the apparatus is in a position for use and exerting downward force on a ground surface (as opposed to a retracted position in which the apparatus is suspended above the ground by a motor vehicle for transport). These terms are relative, and may be used to describe components and/or planes of reference that are generally or substantially "vertical" or "horizontal". Unless otherwise specified, a "vertical" component or axis need not be perfectly perpendicular to a reference plane or surface (e.g., the ground, a pavement surface, etc.), and a "horizontal" component or axis need not be perfectly parallel to the reference plane or surface.

As used herein, the term "tractor" refers to a motor driven vehicle configured to pull or draw an implement such as farming or construction machinery. A tractor may be equipped with one or more functional components coupled to the front and/or rear of the tractor, such as a tractor-loader equipped with a front mounted loader.

As used herein, the term "actuator" refers to a component that is configured to selectively apply force against another component. In the examples described below, the term "actuator" may be used in reference to a hydraulic cylinder and piston assembly. Such actuators may be coupled to a pressurized oil system of a tractor, and may be used to raise, lower, push, pull, rotate/pivot, or otherwise adjust the position of another component. However, in other examples an "actuator" may be or include any other suitable source of motive force known in the art (e.g., a pneumatic cylinder, a motor, etc.) Such devices are known in the art and will not be further described herein.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for surface grading are provided. In exemplary embodiments, a computing device may be endowed with one or more components of the disclosed apparatuses and/or systems and may be employed to perform one or more methods as disclosed herein.

Embodiments herein provide apparatuses and systems for grading, scarifying, or otherwise altering surfaces during the construction and/or maintenance of roads, parking facilities, and other areas. As described further below, a grading apparatus may be coupled to one end of a motor vehicle, such as a tractor. In some embodiments, a grading apparatus may include a rear mounted frame supporting a blade assembly and/or a scarifier. The blade assembly may be pivotable around a substantially vertical axis extending from the blade assembly. The blade assembly may also be pivotable around a substantially horizontal axis extending through the center of the motorized vehicle/frame. The grading apparatus may further include one or more trailing wheels that are selectively positionable along an arcuate path, and/or are laterally displaceable with respect to the frame. Components subjected to wear, such as the blade and replaceable teeth, may be coupled to the grading apparatus with one or more removable fasteners, such as bolts.

The frame of the apparatus may include an inner frame assembly and an outer frame assembly. In some examples, the inner frame assembly is configured to be coupled to an existing three point hitch already installed on the motor vehicle. In other examples, the inner frame assembly includes a three point hitch. In either case, the three point hitch may include a center arm (i.e., a top link) and two lower arms. The forward ends of the lower arms may be coupled to, and pivotally supported by, one end of the motorized vehicle. The lower arms may be movable, and a component of the motor vehicle (e.g., a hydraulic cylinder or hydraulic system of a tractor) may provide motive force to raise, lower, or tilt the lower arms around their forward pivotal axes. In some examples, the three point hitch may also include a pair of upper arms. In some examples a pair of upper arms may be mounted on a transverse rock shaft. The upper arms may extend above the lower arms and may be pivotally connected to the lower arms by draft arm links. In some examples, one or both of the draft links may be replaced with a leveling cylinder to allow adjustment or leveling of the lower arms.

The proximal portion of the inner frame may be supported by the lower two ball joints of the lower arms. The center arm may also be movable. In some examples, the center arm may be, or may be coupled to, an actuator. The center actuator may be selectively operable to 'float' or to be locked into a position. While the actuator is floating, the apparatus may be at least partially supported by the ground and in a position for use in normal grading operations. Raising the lower arms and locking the actuator may allow the grader apparatus to be raised, such as for transport of the apparatus on the job site or to load the motorized vehicle and apparatus for transport to another location.

The outer frame assembly may include one or more horizontal supports and adjustable trailing wheels. The horizontal supports may be configured to be mounted to the rear wheels of a motor vehicle, such as a tractor, or to a portion of the motor vehicle frame forward of the rear wheels of the motor vehicle. The horizontal supports may include two or more joined components that are configured to slide laterally with respect to one another in a telescoping arrangement, allowing extension and retraction of the horizontal supports. The trailing wheels may be pivotally coupled to the outer frame assembly and selectively positionable along an arcuate path around the site of attachment. The trailing wheels, and the portions of the horizontal supports to which they are coupled, may be selectively movable toward and away from a horizontal center line of the inner frame via actuation of movable lateral supports coupled to the blade assembly and to the outer frame. This configuration may allow the trailing wheels to be selectively positioned by an operator to trail behind the blade during normal operation or to be extended outwardly from the blade. The trailing wheels may be extended outwardly, for example, to match an existing or established grade (e.g. concrete or AC slab, concrete curbs or gutters, material previously placed by the blade system, and/or another ground reference) using an outside reference.

The blade assembly may be pivotally mounted to the inner frame assembly and pivotable around a vertical axis, allowing the blade to be angled to the right and left, respective to the center line of the tractor. In addition, the blade assembly may be coupled to the inner frame via a pivot bearing and may be pivotable around a horizontal axis, allowing the lateral ends of the blade to be symmetrically or asymmetrically raised and lowered. For example, the blade may be selectively positionable with the left end of the blade higher than the right end of the blade, or vice versa. This configuration may allow the blade depth at each end of the blade assembly to be adjusted independently of the blade depth at the opposite end. The blade assembly angle and the depth of the lateral ends of the blade may be selectively adjusted via actuators coupled to, and controlled from, the vehicle operator's position. The position of the inner frame or components attached thereto may also be adjusted by the operator of the motor vehicle to adjust the angle of the blade.

The blade assembly may include adjustable end plates pivotally coupled to the blade assembly at each lateral end of the blade assembly, forming 'wings'. The adjustable end plates may also be connected to the inner frame by a sliding mechanism coupled to an actuator assembly. The actuator assembly may be selectively operated by an operator to position the end plates at a desired angle to the center line of the tractor/inner frame. As the blade is rotated (i.e., around a vertical axis and/or a horizontal axis), the disclosed arrangement may allow the sliding mechanism to remain horizontally parallel to the blade assembly and to maintain the adjustable end plates at the selected angle, relative to the center line of the tractor. Thus, the end plates may be maintained at the selected angle regardless of the angle of the blade.

The blade assembly may be pivoted around the horizontal axis, as described above, by way of a vertical adjustment assembly coupled to the outer frame assembly and to the blade assembly. The vertical adjustment assembly may also be coupled to the movable lateral supports, such that the heights of each lateral end of the blade assembly may be selectively adjusted whether the movable lateral supports are extended or retracted. A control block may be coupled to the inner frame assembly, the actuators, and a control panel disposed near the operator's position. The control block may provide an electrical, mechanical, hydraulic, and/or other type of connection between the control panel and the actuators, allowing an operator to remotely control some or all of the actuators of the grading apparatus from the control panel. Thus, the control block may provide electrical signals and/or motive force for remote independent adjustment of the vertical and horizontal angles of the blade assembly, the angles of the end plates, the lateral and rotary position of the trailing wheels, and the positions of various other components (e.g., extension and retraction of the horizontal supports and scarifier assembly components). For example, the control block may be a hydraulic block with valves, one or more manifolds, and electronic circuitry that operably connects the apparatus control panel to some or all of the actuators of the grading apparatus.

Gauges with reference numbers for blade depth reference may be coupled to the outer frame assembly proximal to the trailing wheels. The gauges may include one or more gauge pointers coupled to the blade assembly. The gauge pointer(s) may provide a visual indication of the position of the blade assembly, such as blade depth, for cutting, leveling, or filling surface material. The gauges may allow the blade position to be preset by the operator while moving backwards (e.g., as the operator is backing the motorized vehicle and grading apparatus into position for grading a surface). In some examples, the ends of the blade assembly can be vertically adjusted by the operator with a single control, such as a lever. The single control may be provided in a control panel, which may have one or more other controls for operation of other components of the apparatus. Thus, configurations described herein provide overlap of operational functions for improved efficiency.

In some examples, the apparatus may include a scarifier assembly. The inner frame may include a horizontal cross frame portion coupled to the lower arms of the three point hitch. The cross frame portion may include two sockets that extend from the top surface to the bottom surface of the cross frame portion, as well as an upright support member extending upwardly from the upper surface between the two sockets. Two slide tubes may be disposed vertically through the sockets. A bottom frame member positioned below the cross frame portion may connect the slide tubes. The bottom frame member may be raised and lowered by moving the slide tubes vertically through the sockets. Scarifier shanks may be anchored in the bottom frame member. The shanks may be inserted as individual units or as one or more units (e.g., a unified comb structure). In some examples, the scarifier shanks may be provided with replaceable teeth. The cross frame portion and/or upright support member may be coupled to the bottom frame by an actuator, such as a hydraulic cylinder. A torque bar may be disposed through stationary brackets on the cross frame and/or upright member, and one or more linkages may connect the slide tubes to the torque bar. As the actuator urges vertical displacement of the bottom frame, the torque bar may ensure that equal force is applied to the shanks at each end of the bottom frame member. The actuator may be coupled to the control panel. Thus, the depth of penetration into the surface material may be selectively adjusted by an operator from within the motor vehicle.

Examples of such apparatuses are provided in the drawing and corresponding description below. As shown in the drawings, a rear mounted grader apparatus may include a blade assembly and/or a scarifier assembly, an inner frame assembly, and outer frame assembly. These examples are provided merely by way of illustration, and are not intended to be limiting. In particular, persons with reasonable skill in the art will readily understand that other components may be substituted for those described, and that portions of the illustrated apparatus may be adapted for other uses. For example, the scarifier assembly may be converted to a brush assembly by replacing the scarifier shanks with brush heads. Such modifications and adaptations are contemplated within the present disclosure.

Referring now to FIGS. 1-4, a grader apparatus 100 may be coupled to a motor vehicle via a three point hitch 21. In the illustrated embodiment, the motor vehicle is a tractor. The tractor may be, but is not limited to, any 50 to 130 hp (horsepower) tractor. Alternatively, the motor vehicle may be a tractor with greater than 130 hp. For example, the motor vehicle may be a 50-130 hp tractor with an existing Category 2 three point hitch system and weight on the drive tires of up to 14,000 Lbs.

Figure 3A:
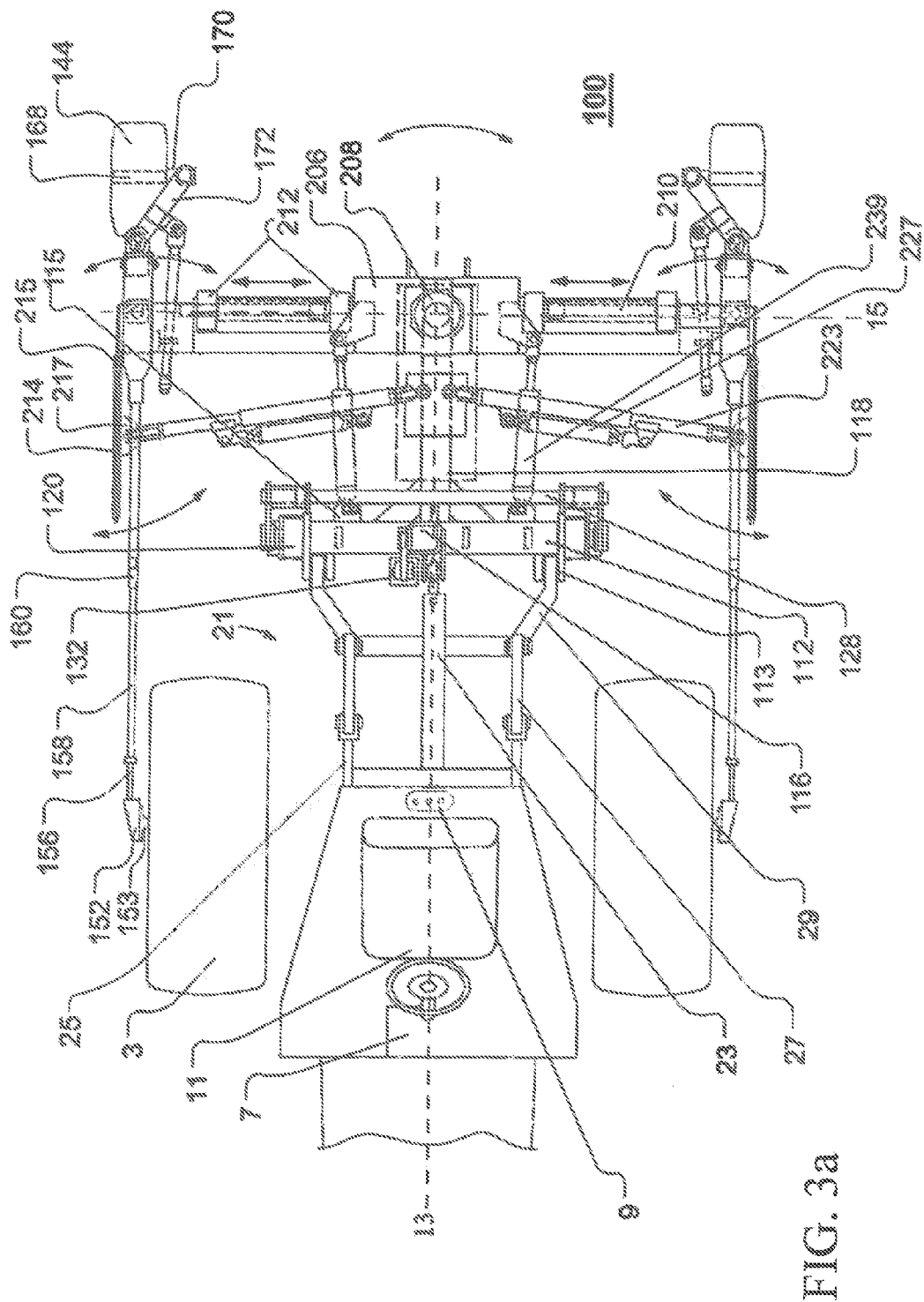
FIG. 3a is a plan view of the rear mounted grader apparatus of FIGS. 1-2.

As shown in FIG. 3a, the tractor may include rear wheels 3, a tractor control console 7, an apparatus control panel 9, and operator housing 11. Operator housing 11 may include a seat, an open or closed cab, and/or any other area of a tractor typically occupied by an operator during use of the tractor. Tractor 1 may have a horizontal center axis 13, illustrated in FIG. 3a for ease of reference. Apparatus control panel 9 may be positioned on or within the tractor, and may be physically, electronically, electrically, hydraulically/pneumatically, or otherwise operatively coupled to one or more of the actuators of grader apparatus 100. In some examples, apparatus control panel 9 is mounted to an exterior portion of the tractor and located behind the seat or cab. In other examples, apparatus control panel 9 may be positioned within the cab or elsewhere.

Figure 3B:
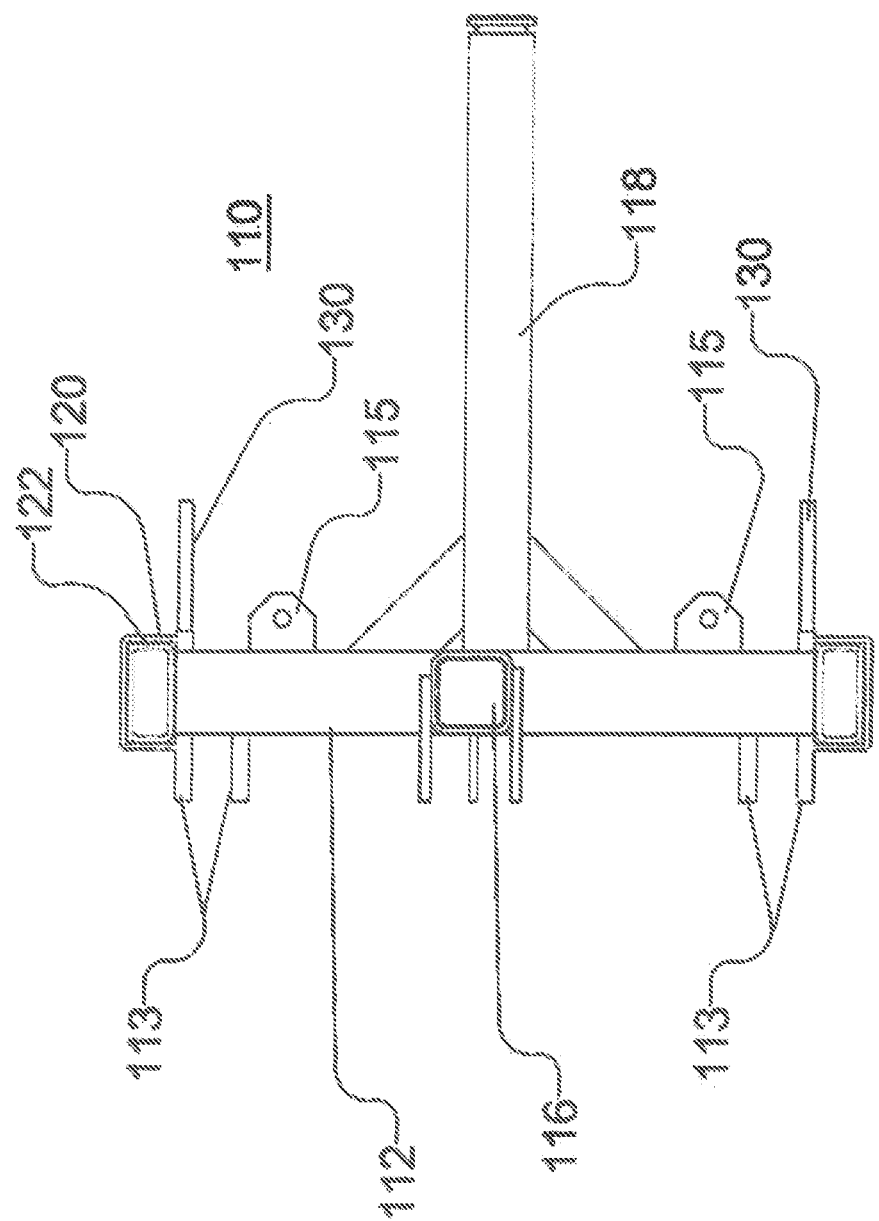
Figure 3C:
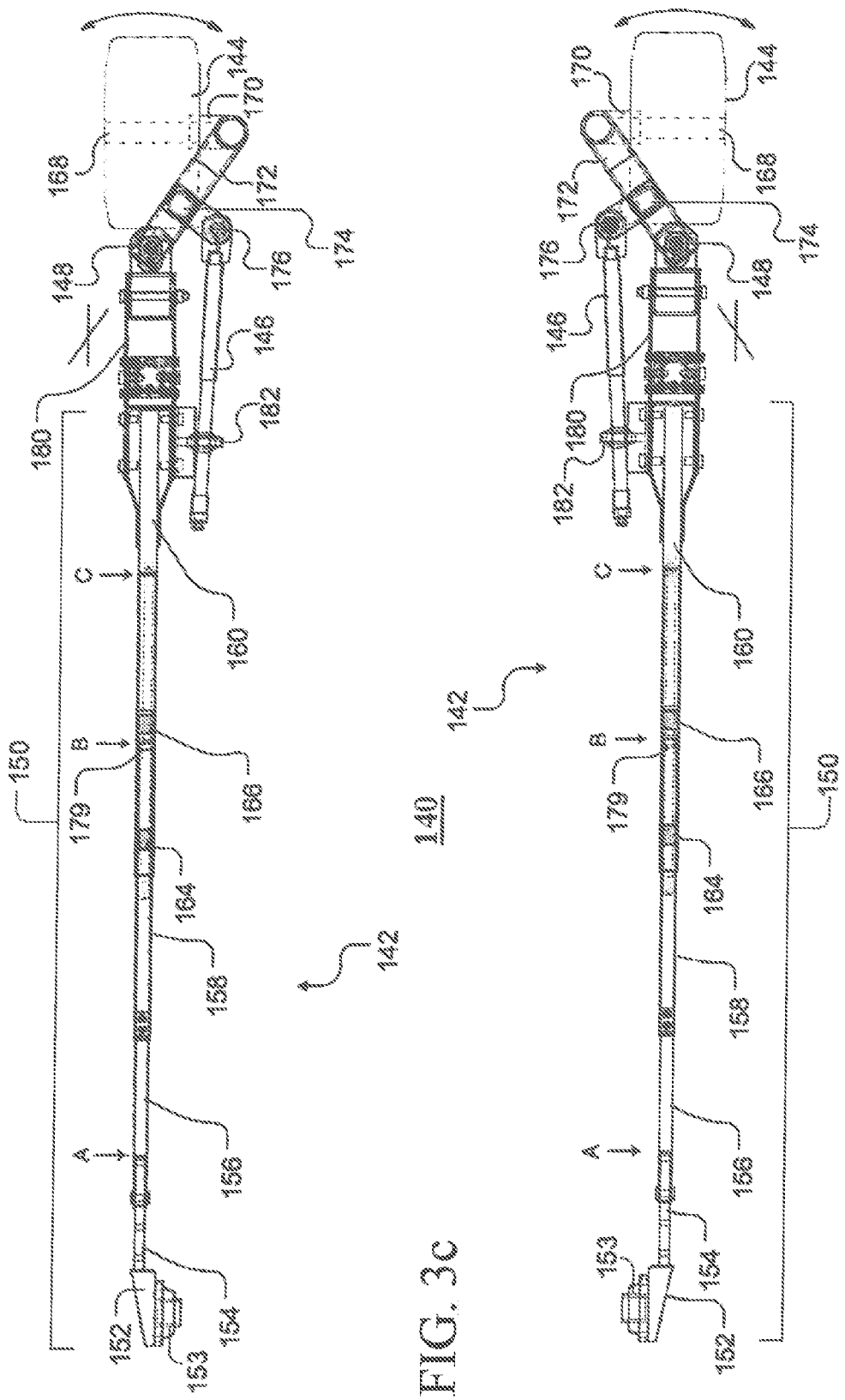

Grader apparatus 100 may include an inner frame assembly 110 (FIG. 3b) and an outer frame assembly 140 (FIG. 3c). As best shown in FIG. 3a, inner frame assembly 110 may be reversibly coupled to the tractor by a three point hitch 21 coupled to the frame of the tractor. Three point hitch 21 includes a center arm 23, two upper arms 25, two link arms 27, and two lower arms 29 (see FIGS. 1 and 2). The lower arms 29 are movably coupled to the tractor, and can be raised and lowered by way of a hydraulic cylinder or other known motive force mechanism. Center arm 23 is movably coupled to the tractor above and/or between lower arms 29.

The inner frame assembly 110 (FIG. 3b) includes a cross frame member 112 and upright support 116. Inner frame assembly 110 may also include a medial frame member 118 that extends from a distal side of cross frame member 112 substantially along a horizontal center axis 13. Cross frame member 112 is pivotally coupled at its two lateral ends, via brackets 113 (FIGS. 3a and 3b), to the distal ends of lower arms 29. Upright support 116 extends vertically from the upper surface of the cross frame member 112 and is pivotally coupled to the distal end of center arm 23 (see also FIG. 1). In this example, center arm 23 is a hydraulic cylinder that can be selectively locked at a desired position (e.g., fully retracted) or unlocked and permitted to freely extend and retract (i.e., 'floating'). The grader apparatus 100 can be raised by raising the lower arms 29 and retracting center arm 23. Center arm 23 may then be selectively locked in that position, such as for transport of the grader apparatus on a job site or to load the motorized vehicle and apparatus for transport to another location. While the actuator is floating, the apparatus may be at least partially supported by the ground and in position for use in normal grading operations.

In some embodiments, inner frame 110 may form a portion of a scarifier assembly. FIG. 4 provides two perspective views of a scarifier assembly in accordance with various embodiments described herein. As best shown in FIG. 3b, cross frame member 112 may include one or more sockets 120 that extend through the cross frame member from the upper surface to the lower surface. Referring again to FIG. 4, slide tubes 122 are movably disposed through the sockets 120. A bottom frame member 124 extends laterally below cross frame member 112 and joins the slide tubes 122. Scarifier shanks 134 may be disposed through, or coupled to the lower surface of, bottom frame member 124. Optionally, replaceable teeth 136 may be coupled to scarifier shanks 134.

Each slide tube 122 may be coupled to one end of an articulated arm 126 (FIG. 4). The other end of each articulated arm 126 may be coupled to a torque bar 128, which may be secured within brackets 130 disposed on the distal side of cross frame member 112. An actuator 132, such as a hydraulic cylinder, may be coupled to cross frame member 112 and/or upright support 116 and to bottom frame member 124. Actuator 132 may provide motive force to raise and lower the bottom frame member 124. As the actuator 132 raises and lowers the bottom frame member 124, the torque bar maintains equal force on the scarifier shanks at each end of the bottom frame member 124. The depth of penetration into the surface material is controlled by an operator via control panel 9 (FIG. 1).

Referring now to FIG. 3c, the outer frame assembly 140 may include two side frame assemblies 142. Each side frame assembly 142 may further include a side plate 180 coupled to a horizontal support 150 and to a trailing wheel 144. Horizontal support 150 may include a mount 152, a coupler 154, a first slideable arm 156, a second slideable arm 158, and/or a side plate arm 160 (see FIGS. 3c and 5). Mount 152 may be configured to be coupled to a wheel of a motorized vehicle (e.g., to a rear wheel 3 of the tractor) or to the frame of the motorized vehicle by bolts or other fasteners. Coupler 154 may be a plate, bar, or other structure used to join mount 152 to the remaining components of horizontal support 150. Some embodiments may lack one or more of these components. For example, coupler 154 may be omitted and mount 152 may be coupled to first slideable arm 156.

Figure 5:
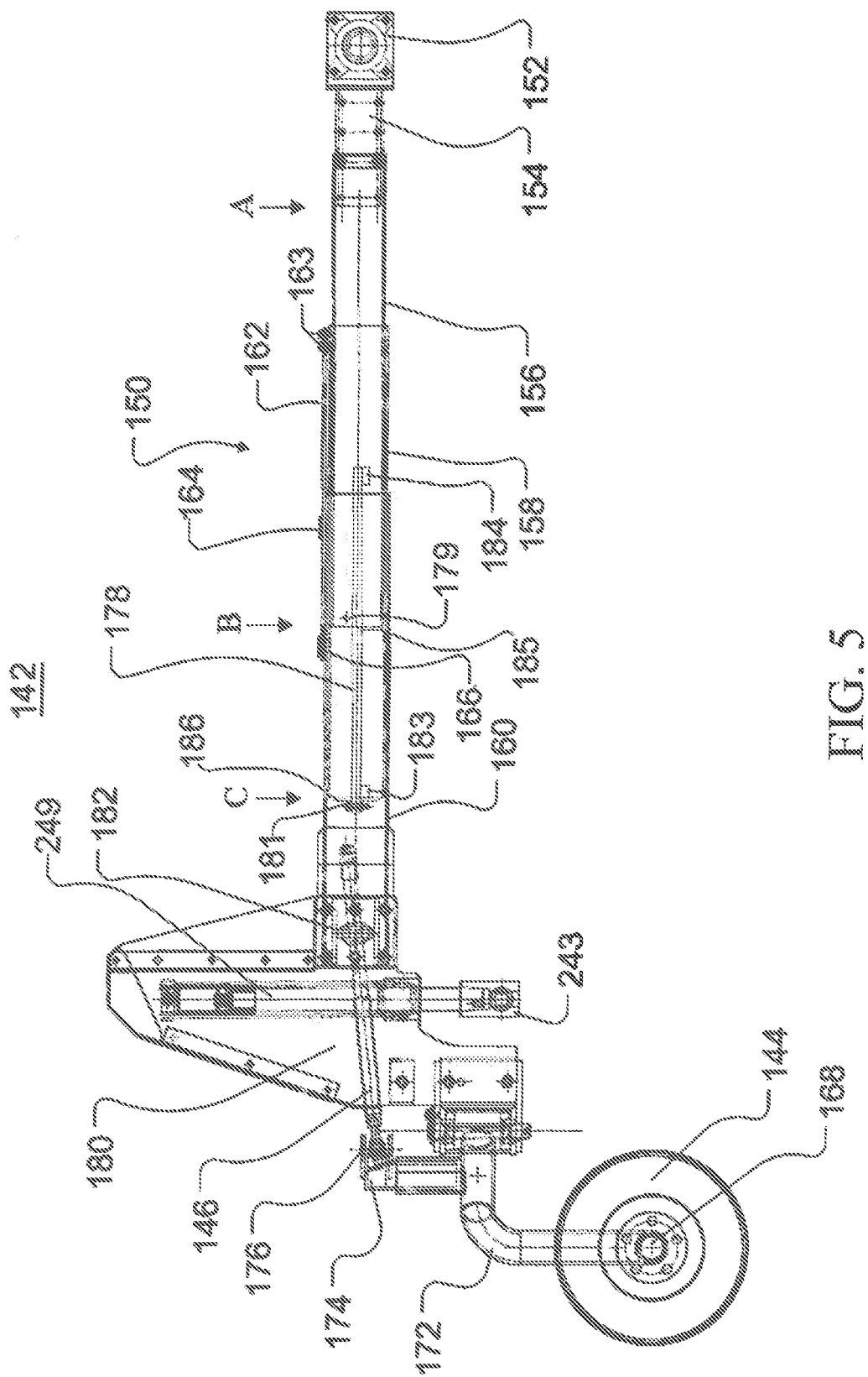
FIG. 5 is a side view of a side frame assembly of the rear mounted grader apparatus of FIGS. 1-4.

Mount 152 may include a pivot bearing 153 (FIG. 3c). The pivot bearing 153 may have two outer portions that are independently rotatable around a central axis. One outer portion may be coupled to the rear wheel of the motorized vehicle (e.g., placed around the axle, or secured with bolts or other fasteners) and the other outer portion may be bolted or otherwise fastened to the proximal end of coupler 154. The distal end of coupler 154 may be received within first slideable arm 156. Coupler 154 may be bolted or otherwise fastened to the proximal end of first slideable arm 156. Coupler 154 may have multiple bolt holes or attachment sites spaced at intervals along its length (FIG. 5). Multiple attachment sites may be provided to accommodate variations in the distance between the distal end of the rear wheel of the tractor and the attachment site for the apparatus (e.g., the lower arms 29 of the three point hitch, FIG. 1) among different tractor and three point hitch configurations. For example, the lower arms of a three point hitch may extend 6 to 8 inches behind the distal end of the rear wheel of one tractor, while the lower arms of the three point hitch may extend 15 to 17 inches behind the distal end of the rear wheel of another tractor. Therefore, the distance between mount 152 and the proximal end of first slideable arm 156 may be adjusted by removing the bolts or other fastener(s) from the bolt holes or attachment sites, pushing or pulling coupler 154 within first slideable arm 156 to place the proximal end of first slideable arm 156 at the desired distance from mount 152, and replacing the bolts or other fastener(s) in the corresponding both holes or attachment sites.

Figure 7:
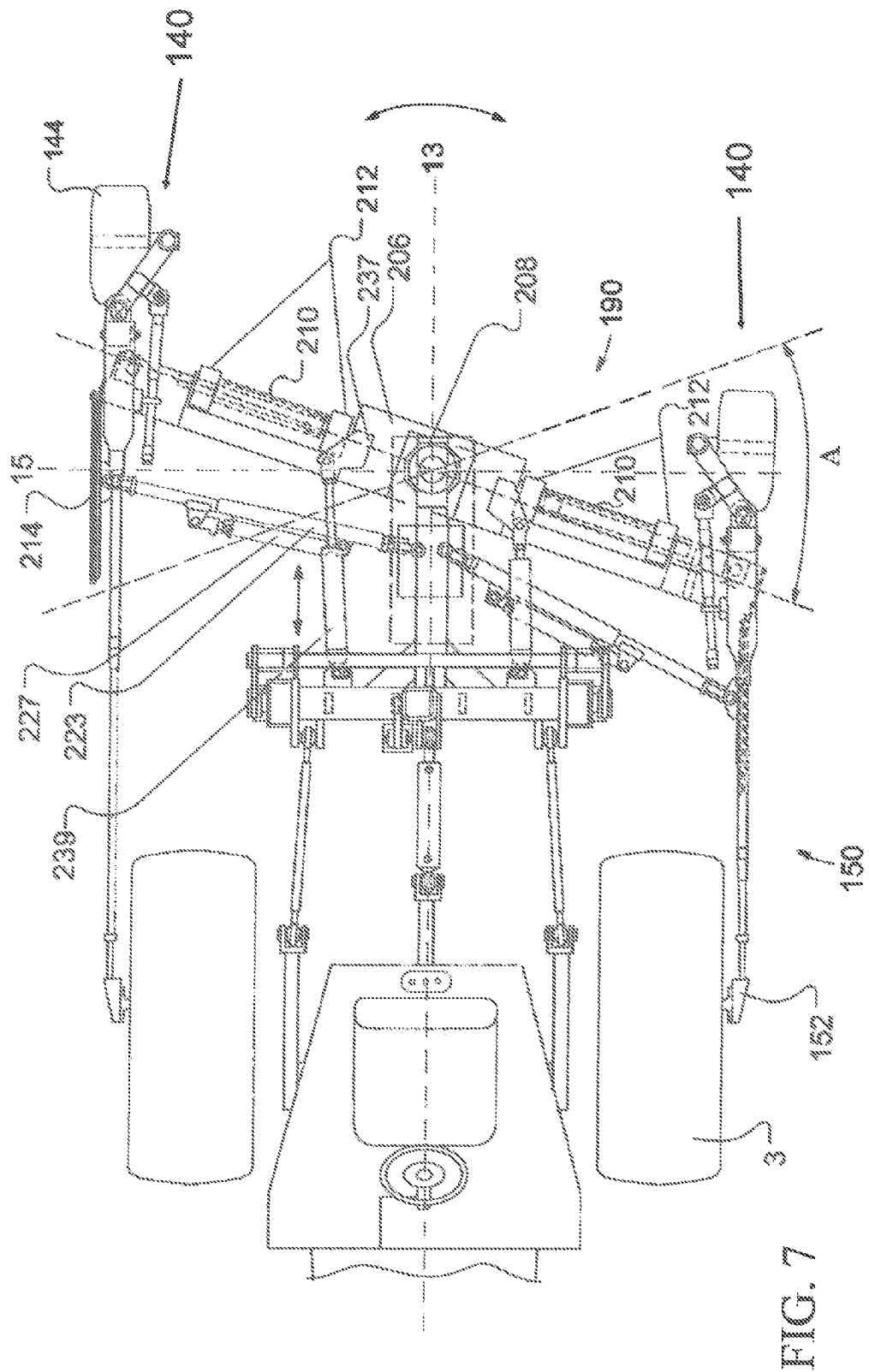
FIG. 7 is a plan view of the rear mounted grader apparatus of FIGS. 1-6, illustrating the rotation of a blade assembly around a vertical axis.

The distal end of first slideable arm 156 is received within the proximal end of second slideable arm 158. The distal end of second slideable arm 158 is received within a proximal end of side plate arm 160. The telescoping configuration of these components is best shown in FIGS. 3c and 5, in which the distal ends of coupler 154, first slideable arm 156, and second slideable arm 158 indicated by Arrows A, B, and C, respectively. This telescoping configuration allows extension and retraction of horizontal support 150 relative to rear wheel 3 of the tractor. As best shown in FIG. 7, the sliding/telescoping horizontal supports 150 accommodate rotation of the blade assembly 190 around a vertical axis, which allows the angle of the blade to be adjusted as desired. The telescoping configuration also allows the blade assembly to be extended and retracted, and allows the grading apparatus to be drawn into a more compact form for transportation One or more components may be provided to stabilize the telescoping motion of the arms and/or to limit the retraction and extension of horizontal supports 150. In the illustrated example (FIG. 5), an extension control member 178 may be disposed between first slideable arm 156 and second slideable arm 158. An end guide 185 may be coupled to the distal end of first slideable arm 156, and another end guide 186 may be coupled to the distal end of second slideable arm 158. Extension control member 178 may pass through a hole or notch (not shown) in end guides 185 and 186. Upper and lower guide members may also be provided to prevent vertical displacement of extension control member 178. As shown in FIG. 5, an upper guide member 179 (e.g., a pin or bolt) may be disposed through first slideable arm 156, and one or more lower guide members (e.g., lower support member 183) may be coupled to second slideable arm 158 and/or first slideable arm 156. The upper and lower guide members may limit the vertical movement of extension control member 178. Alternatively, a continuous or semi-continuous channel/track assembly (not shown) may be used to guide and stabilize the telescoping motion of the arms.

A stop member 184 may be coupled to the proximal end of extension control member 178. Another stop member 181, such as a bolt, may be coupled to the distal end of extension control member 178. The stop members 184 and 181 may limit the extension and retraction of first slideable arm 156 into second slideable arm 158. First slideable arm 156 may be extended from second slideable arm 158 until stop member 184 is brought into contact with end guide 185, blocking further extension of first slideable arm 156 from second slideable arm 158. Likewise, first slideable arm 156 may be retracted into second slideable arm 158 until end guide 185, upper guide member 179, or other component coupled to first slideable arm 156 is brought into contact with end guide 186 and/or stop member 183. This contact may block further retraction of first slideable arm 156 into second slideable arm 158.

Additional components may be provided to limit the extent of expansion and retraction of second slideable arm 158 into side plate arm 160. In the example shown in FIG. 5, a guide member 162 is attached at its proximal end to the proximal end of second slideable member 158 by bolts 163. A bracket 164 is coupled to the upper surface of side plate arm 160, and the guide member 162 is slideably disposed through bracket 164. A stop member 166 is attached to the distal end of guide member 162 (see also FIG. 1). Stop member 166 and bolts 163 may exceed the dimensions of the gap created by bracket 164, providing a stop at each end of guide member 162. In operation, as second slideable arm 158 is retracted into side plate arm 160, guide member 162 slides through bracket 164. Second slideable arm 158 may be retracted into side plate arm 160 until the bolts 163 reach bracket 164, which prevents further retraction of second slideable arm 158 into side plate arm 160. Likewise, as second slideable arm 158 is extended from within side plate arm 160, guide member 162 slides through bracket 164 until stop member 166 reaches bracket 164, which prevents further extension of second slideable arm 158 from side plate arm 160. The proximity of stop member 166 to bracket 164 may provide a visual indicator of the degree of extension/retraction.

Referring again to FIG. 3c, each side frame assembly 142 also includes a trailing wheel 144. Trailing wheel 144 is rotatable around axle 168, and a portion of axle 168 is rotatably received within a lower end of axle support 170. An upper end of axle support 170 is received within trailing wheel support 172 (see also FIG. 8). Trailing wheel support 172 may be pivotally coupled to side plate 180 via a vertically disposed pivot member 148 (see also FIG. 1), allowing trailing wheel support 172 and trailing wheel 144 to move along an arcuate path as shown by the corresponding arrows in FIG. 3c. Thus, outer frame assembly 140 is supported by the rear wheel 3 of the tractor (or alternative attachment site on the frame of the tractor) and by the trailing wheels 144.

Figure 9A:
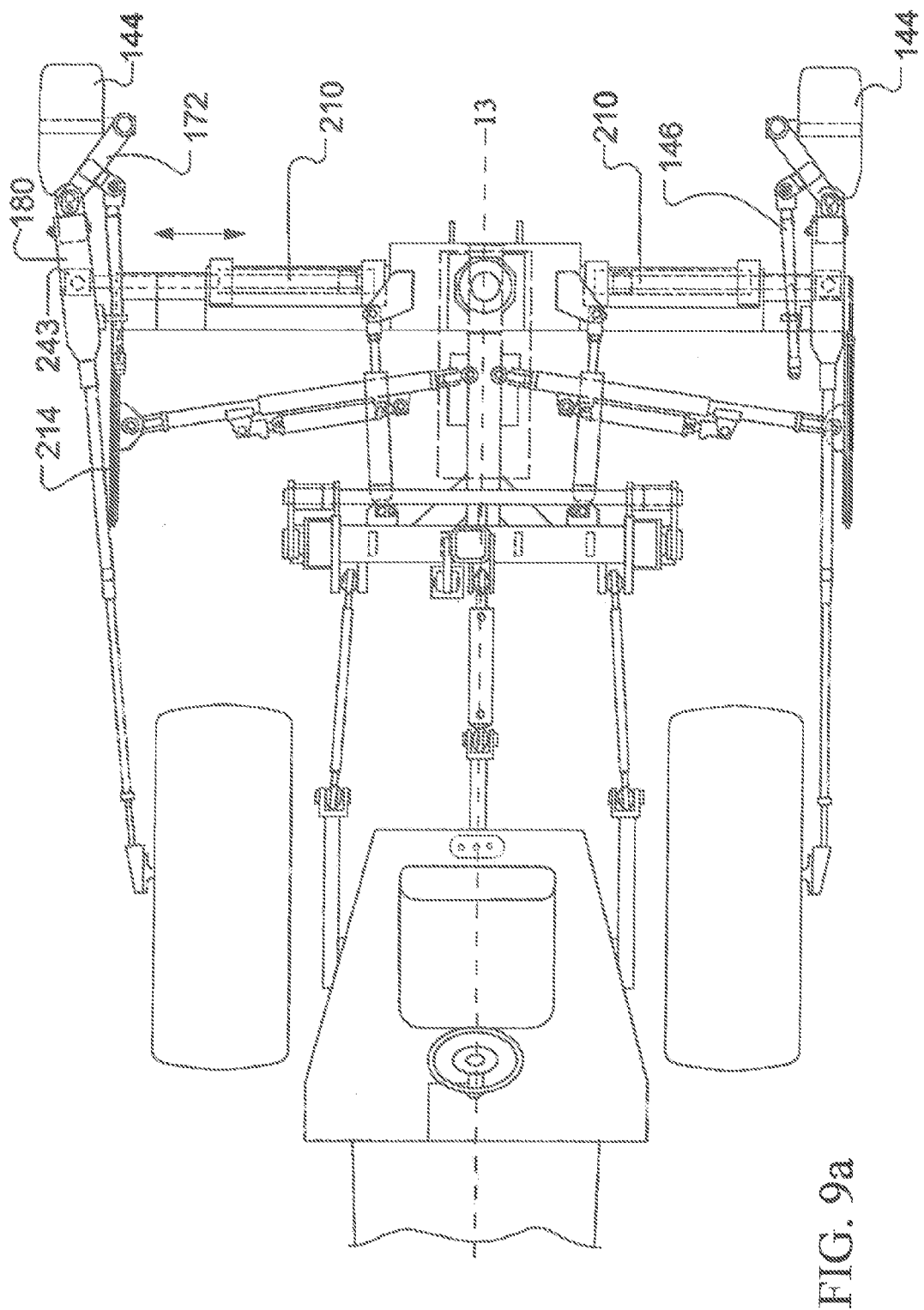
FIG. 9a is a plan view illustrating the lateral extension of a trailing wheel on the rear mounted grader apparatus of FIGS. 1-8.
Figure 9B:
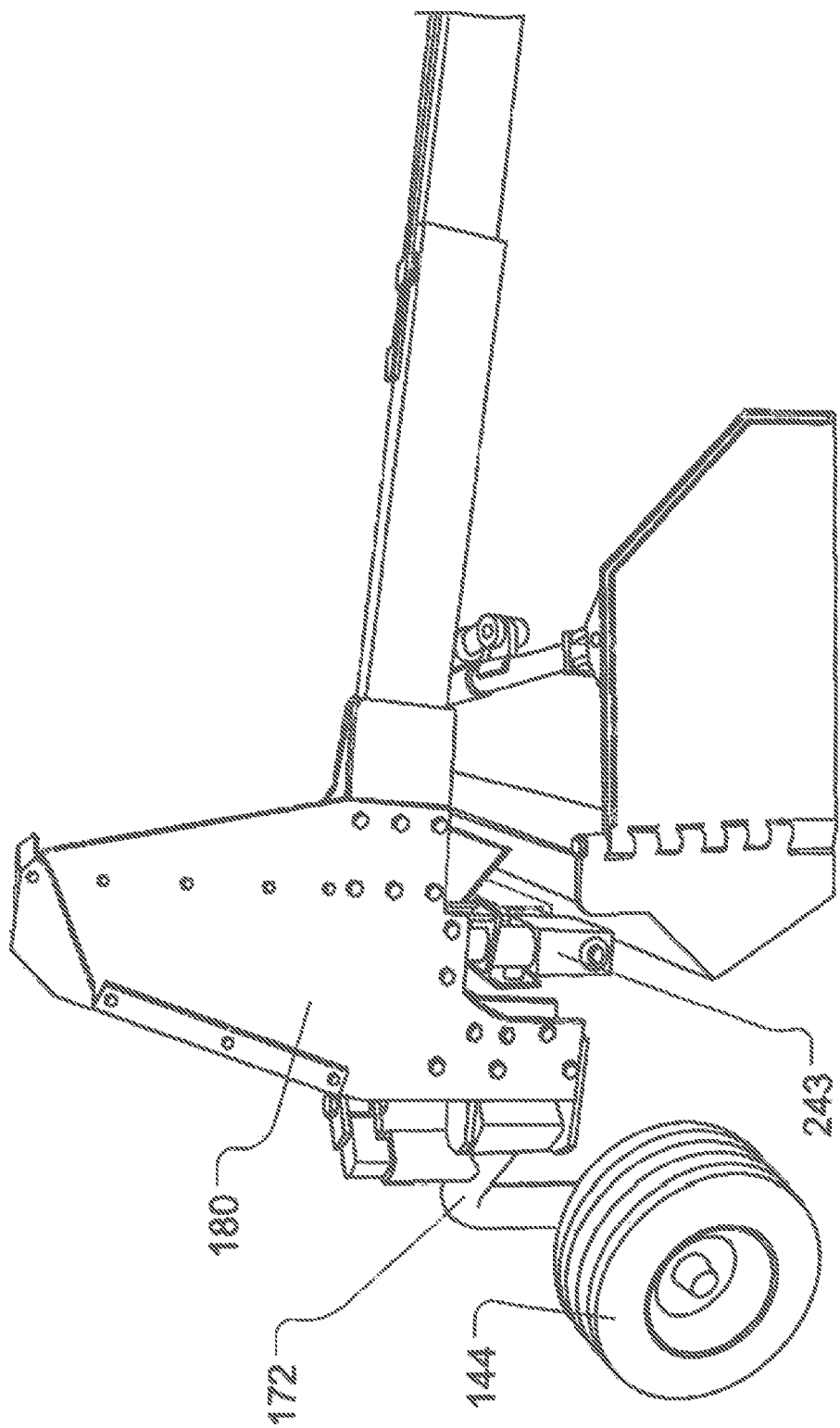
FIGS. 9b and 9c are perspective views illustrating the lateral extension of a trailing wheel on the wheel mounted grader apparatus of FIGS. 1-8.
Figure 9C:
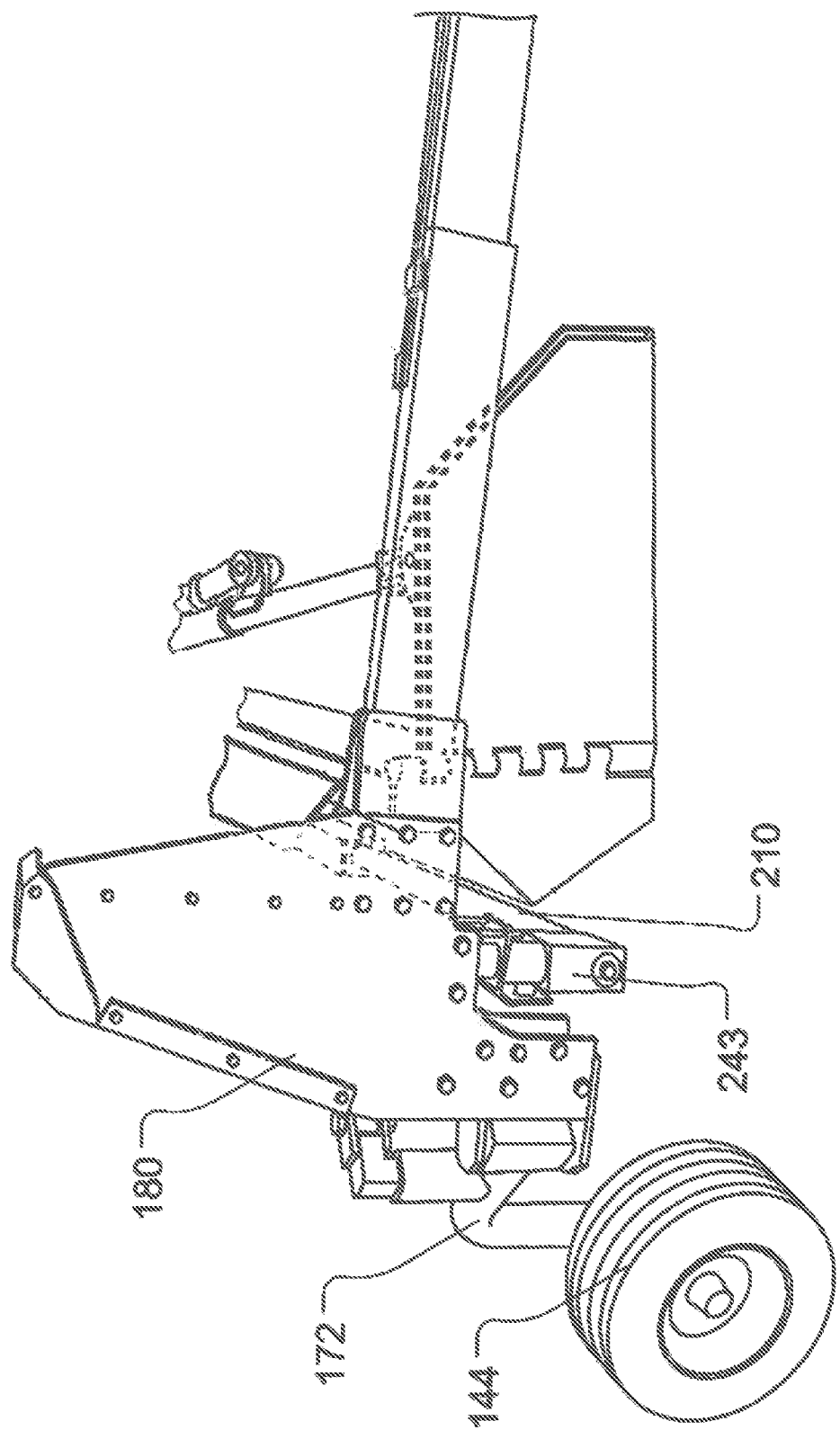

Motive force for controlling travel of trailing wheel support 172 along the arcuate path may be provided by actuator 146. Actuator 146 may be pivotally coupled to trailing wheel support 172, such as by way of a coupler 174 that extends from trailing wheel support 172 (see also FIG. 1). Coupler 174 and a first end of actuator 146 may be pivotally coupled by pivot member 176. Actuator 146 may also be fixedly or movably coupled at its opposite end, or along its length, to side plate 180. In the illustrated example, actuator 146 is coupled to side plate 180 via a bracket 182. In some examples, bracket 182 may be configured to allow swiveling or limited rotation of actuator 146. Actuator 146 may be used to selectively apply force to trailing wheel support 172, thereby adjusting the position of trailing wheel support 172 along the arcuate path. In addition, as shown in FIGS. 9a-c and described further below, the trailing wheel supports 172 are laterally extendable and retractable by movable lateral supports connected to the outer frame assembly 140 and to the blade assembly. Thus, the arcuate path traveled by trailing wheels 144 can be shifted laterally away from the center line 13 of the tractor/inner frame.

A blade assembly 190 may be coupled to the inner frame assembly 112 and to the outer frame assembly (Not shown in FIG. 2). Blade assembly 190 may include a support panel 192. Support panel 192 may be generally arcuate in shape and may extend horizontally below side plate arms 160. One or more cutting members 194 may be fastened to the lower end of the proximal side of support panel 192 by bolts 196. Optionally, one or more components of the blade assembly and/or scarifier assembly may be constructed from high strength steel. Examples of high strength steel include, but are not limited to, carbon steels and alloy steels. For example, the cutting member 194 may be constructed from alloy steel that includes molybdenum and/or chromium, such as steel with the SAE designation of 4572. Such blades may have a useful service life of 2000-10000 hours (e.g., 5000 hours).

Optionally, one or more exterior panels may be coupled to the opposite side of support panel 192. In the illustrated embodiment, the bolts 196 that secure the cutting member 194 to the proximal side of support panel 192 also secure an exterior panel 198 and two exterior side panels 200 to the distal side of support panel 192. Exterior end panels 202 are provided at the lateral ends of support panel 192. As shown, exterior end panels 202 may be integral to support panel 192. Alternatively, they may be constructed as separate units and joined by welding, bolts, or other fasteners.

An end plate 214 may be pivotally coupled to each end of the blade assembly 190 at the proximal ends of exterior end panels 202 (see FIG. 1). In some embodiments, end plate 214 and exterior end panel 202 have corresponding hinge portions that are coupled with a vertical pivot member 215. The opposite ends of end plates 214 may be tapered and/or curved. Optionally, one or more additional cutting members may be removably coupled to the lower portion of the interior surface of end plate 214.

Figure 11:
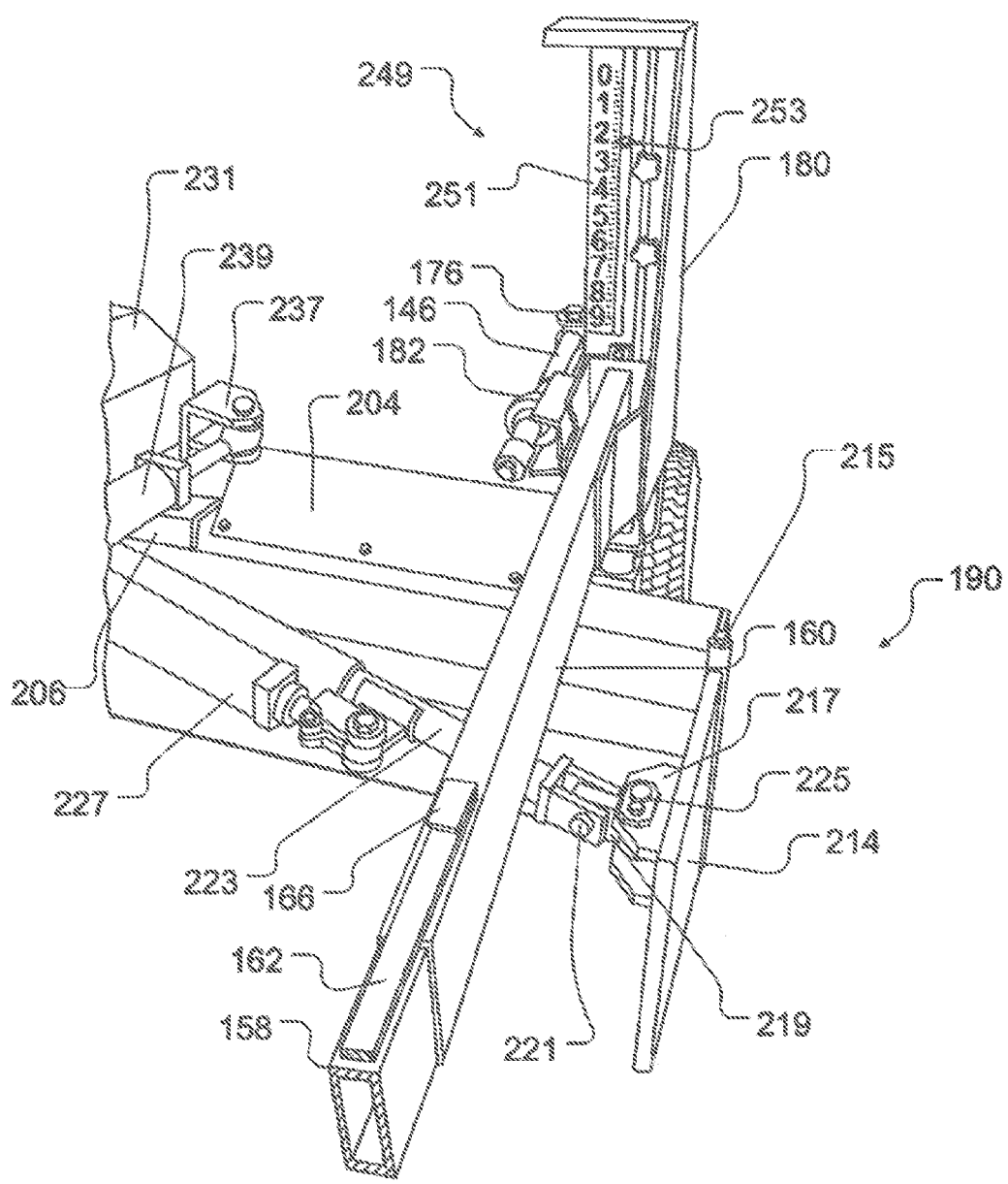
FIG. 11 is a perspective view of a portion of a blade assembly and gauge of the rear mounted grader apparatus of FIGS. 1-10.

As shown best in FIG. 11, the interior surface of each end plate 214 (i.e., the surface facing the horizontal center axis 13) may be provided with an end plate bracket 217. A coupler 219 may be pivotally coupled to end plate bracket 217 by a pivot member 225, allowing the coupler 219 to pivot around a substantially vertical axis. Coupler 219 is pivotally coupled by pivot member 221 to one end of a slideable arm 223, which includes a pair of telescoping rods. The opposite end of slideable arm 223 is pivotally coupled to medial frame member 118.

Mounted on each slideable arm 223 is an actuator 227 (FIGS. 3 and 11). The actuators 227 provide motive force to adjust the angle of the end plates 214 relative to horizontal center axis 13. FIGS. 9d and 9e illustrate the adjustment of the angle of an end plate 214. For ease of reference, FIGS. 9d and 9e show a horizontal axis 14 that extends parallel to the horizontal center axis 13. FIG. 9d shows an end plate 214 positioned at an angle of 0°, or parallel to horizontal center axis 13/horizontal axis 14. FIG. 9e shows the same end plate 214 positioned at an angle of 45° relative to the same axes. End plates 214 may be positionable at various angles between 0° (i.e., parallel to center axis 13) and 45°, such as 5°, 10°, 15°, 20°, 25°, 30°, 35°, 40°, or other angles within that range. The lengths of the blade assembly and end plates may vary among embodiments. For example, a support panel 192 with integral end panels 202 may be eight feet in length and the two end plates 214 may be three feet in length, allowing for a grading width of eleven feet when the support panel is positioned at an angle of 90° and the end plates 214 are positioned at an angle of 45° relative to the horizontal center axis 13. As described further below, slideable arms 223 maintain the selected angle of the end plates 214 relative to horizontal center axis 13 when the support panel is angled.

Figure 6A:
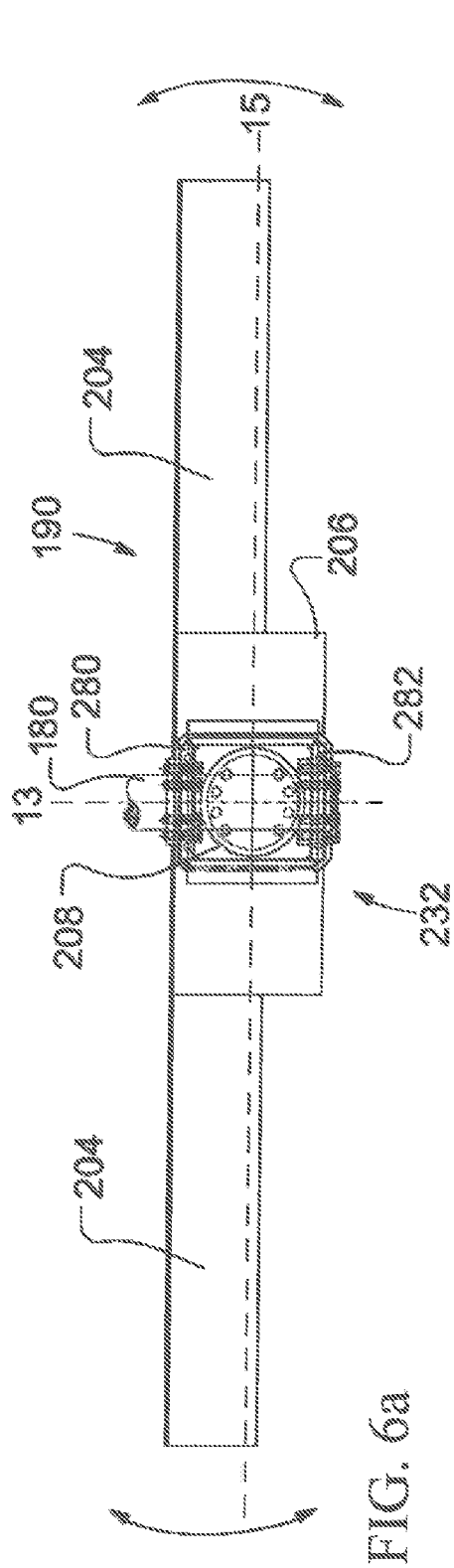
FIGS. 6a and 6b are block diagrams illustrating horizontal (FIG. 6a) and vertical (FIG. 6b) rotational axes of the blade assembly of the rear mounted grader apparatus of FIGS. 1-5.

Blade assembly 190 may be pivotable around both a vertical axis, allowing the blade to be angled with respect to horizontal center axis 13, and/or pivotable around a horizontal axis, allowing the height of each end of the blade to be adjusted independently (FIGS. 6a and 7). A support mount 206 may be coupled to the upper surface of support panel 192. Support mount 206 may be positioned centrally, in alignment with a substantially vertical axis 229 extending upwardly through the center of the blade assembly 190. Optionally, one or more exterior top panels 204 may also be coupled to the upper surface of support panel 192 at one or both sides of support mount 206.

Figure 6B:
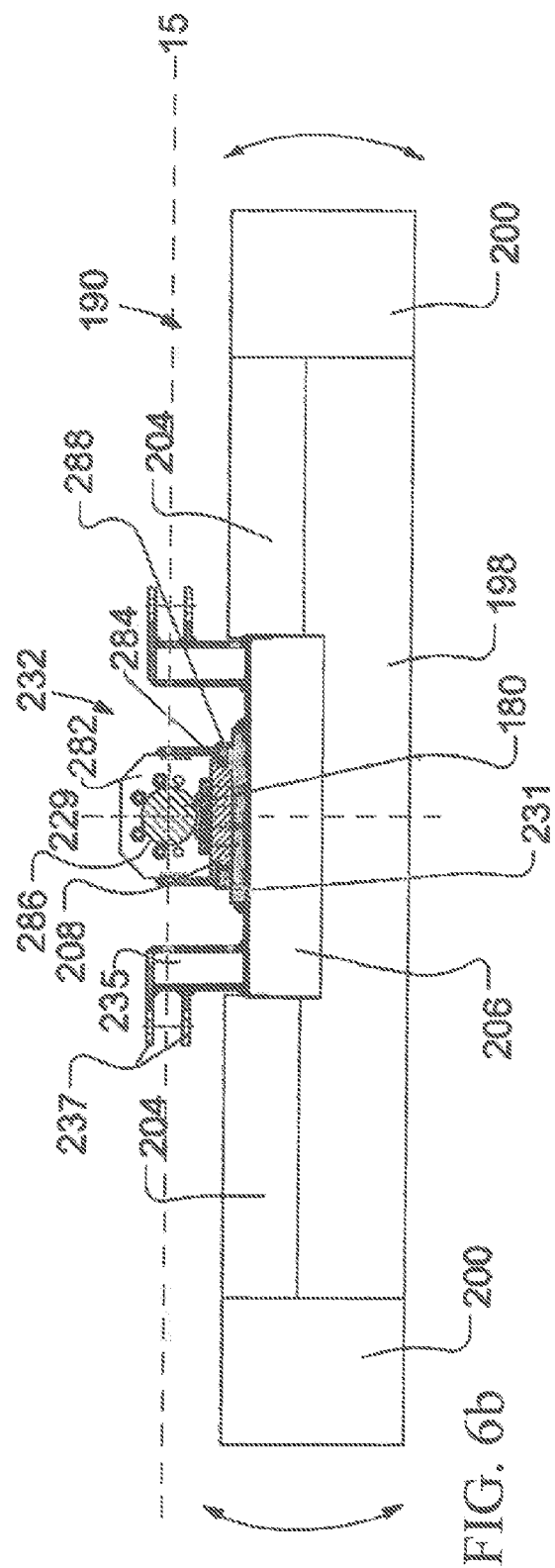
Figure 8:
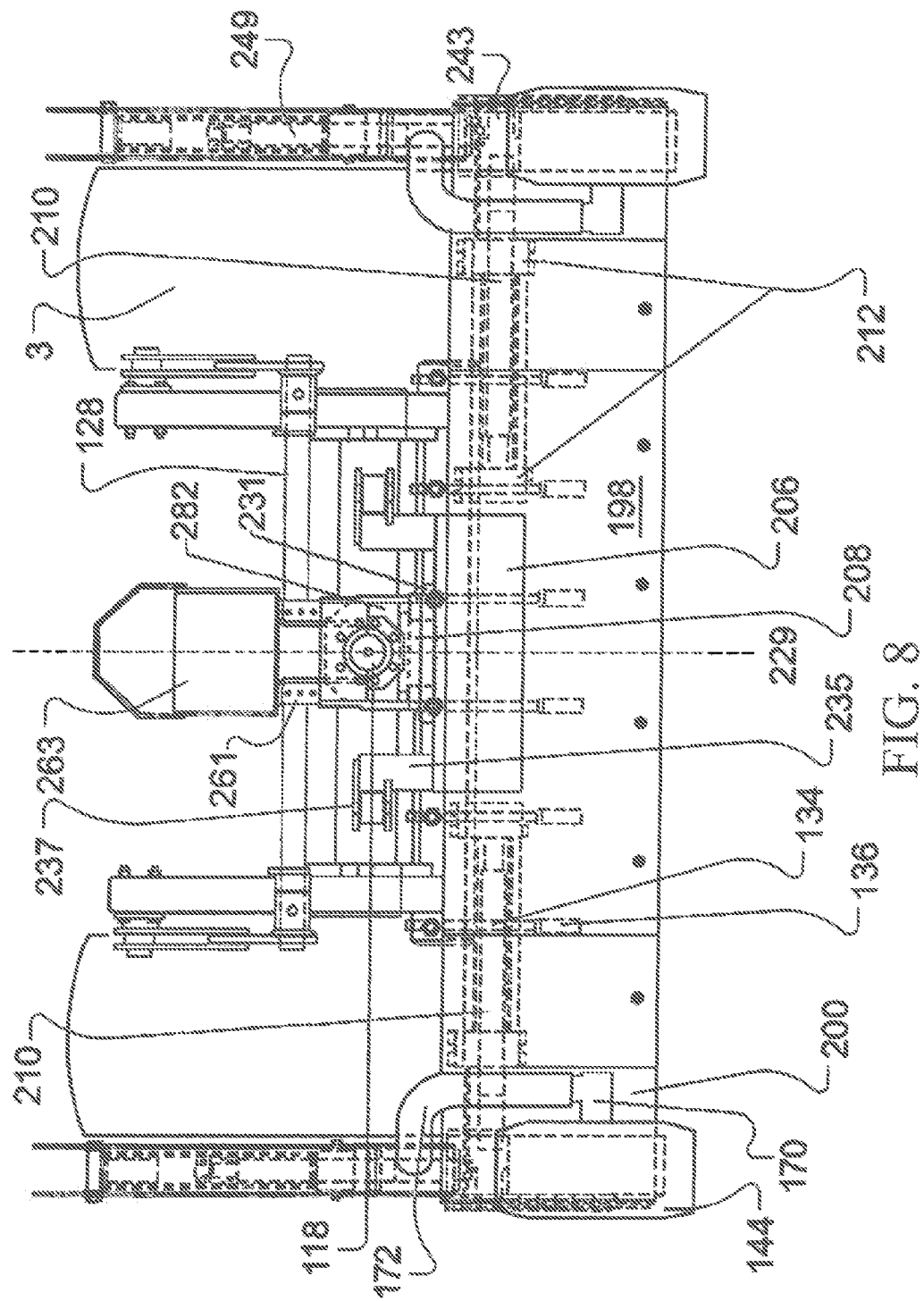
FIG. 8 is a rear view of selected components of the rear mounted grader apparatus of FIGS. 1-7.

Support mount 206 may be coupled to a pivot assembly 232 (FIG. 2). FIGS. 6a and 6b show block diagrams of blade assembly 190 and pivot assembly 232 as a plan view (FIG. 6a) and a rear elevational view (FIG. 6b; see also FIG. 8). FIG. 6a illustrates the vertical rotational axis of blade assembly 190, while FIG. 6b illustrates the horizontal rotational axis of blade assembly 190 (indicated by arrows).

As illustrated in FIGS. 6a and 6b, pivot assembly 232 may include a top mount 231, a proximal yoke member 280, a distal yoke member 282, a retaining member 288, and a pivot bearing 208. Referring to FIG. 6b, top mount 231 may be fixedly coupled along its bottom surface to support mount 206. Retaining member 288 may be positioned on the upper surface of top mount 231, and may have an interior aperture with a bearing surface 284 (e.g., a lubricated bearing surface). The bottom of pivot bearing 208 may be fixedly coupled to support mount 231. Pivot bearing 208 may extend vertically through the interior aperture of retaining member 288, with the upper portion of pivot bearing 208 retained on the upper surface of retaining member 288. For example, pivot bearing 208 may include an upper lip or edge that rests on the upper surface of retaining member 288. As pivot bearing 208 rotates around vertical axis 229, top mount 231, support mount 206, and blade assembly 190 are also rotated.

Retaining member 288 may be fixedly coupled to distal yoke member 282 and proximal yoke member 280. Distal yoke member 282 and proximal yoke member 280 may extend vertically upward, and each may include an aperture with an inner bearing surface (e.g., bearing surface 286, shown in FIG. 6b). The distal end of medial frame member 118 may extend through the apertures of distal yoke member 282 and proximal yoke member 280. Thus, distal yoke member 282 and proximal yoke member 280 are rotatable around medial frame member 118 and center horizontal axis 13. This configuration allows the lateral ends of blade assembly 190 to be independently raised and lowered, as discussed further below. Distal yoke member 282 and proximal yoke member 280 may be rotatable around medial frame member 118 within a range of 10° (i.e., 5° clockwise to 5° anticlockwise), 20° (i.e., 10° clockwise to 10° anticlockwise), or more than 20°.

Support mount 206 may include support mount brackets 237 (FIGS. 6b, 8 and 11). In some examples, two support mount brackets 237 may be secured to corresponding bracket support members 235 that extend upwardly from the support mount 206 at equal distances from the vertical axis 229. As best shown in FIGS. 3a, 7, and 11, each support mount bracket 237 may be pivotally coupled to one end of a corresponding actuator 239. The opposite end of each actuator 239 may be pivotally coupled to brackets 115 of cross frame member 112. For example, an actuator 239 may be coupled to the left support mount bracket 237 and to a similar bracket disposed on the left side of upright support 116. The actuators 239 are operable to apply force against the corresponding bracket support members.

As best shown in FIG. 7, the combination of pivot bearing 208 and the extension and retraction of horizontal supports 150 (FIG. 7) allow an operator to selectively adjust the angle of blade assembly 190. The blade assembly 190 can be angled by operating the actuators 239 to apply force against the two bracket support members 235. For example, extending one of the actuators 239 while retracting the other actuator 239 causes the blade assembly 190 to pivot around vertical axis 229 (FIG. 6b), altering the angle of the blade assembly with respect to horizontal center axis 13. FIGS. 3a and 7 show blade assembly 190 in a non-rotated position (FIG. 3a) and a rotated position (FIG. 7). A longitudinal axis 15 is indicated in these Figs. for ease of reference. Longitudinal axis 15 is perpendicular to, and intersects, horizontal center axis 13 and vertical axis 229 (see also FIGS. 6a and 6b). As blade assembly 190 is rotated around vertical axis 229, the lateral ends of the blade assembly form opposite angles of equal magnitude with respect to longitudinal axis 15. In the non-rotated position shown in FIG. 3a, blade assembly 190 is rotated 0° around vertical axis 229. The blade assembly 190 extends parallel to longitudinal axis 15, and each end of the blade assembly extends at an angle of 90° to horizontal center line 13. In the rotated position of FIG. 7, blade assembly 190 is shown rotated 20° clockwise around vertical axis 229, with one lateral end of the blade assembly at an angle of 70° to horizontal center axis 13.

The range of rotation (Arrow A, FIG. 7) of the blade assembly 190 around vertical axis 229 may vary among embodiments. For example, blade assembly 190 may have a range of rotation of 40° around vertical axis 229 (e.g., from 20° clockwise to 20° anticlockwise), allowing the blade assembly to be selectively positioned at any corresponding angle within that range (e.g., with one lateral end of the blade assembly at an angle of 70° to 110° to horizontal center axis 13). As another example, blade assembly 190 have a range of rotation of 90° around vertical axis 229 (e.g., from 45° clockwise to 45° anticlockwise), and the blade assembly may be selectively positioned at any corresponding angle within that range (e.g., with one lateral end of the blade assembly at an angle of 45° to 135° to horizontal center axis 13). Alternatively, blade assembly 190 may have any range of rotation between 40° and 90°.

Figure 10:
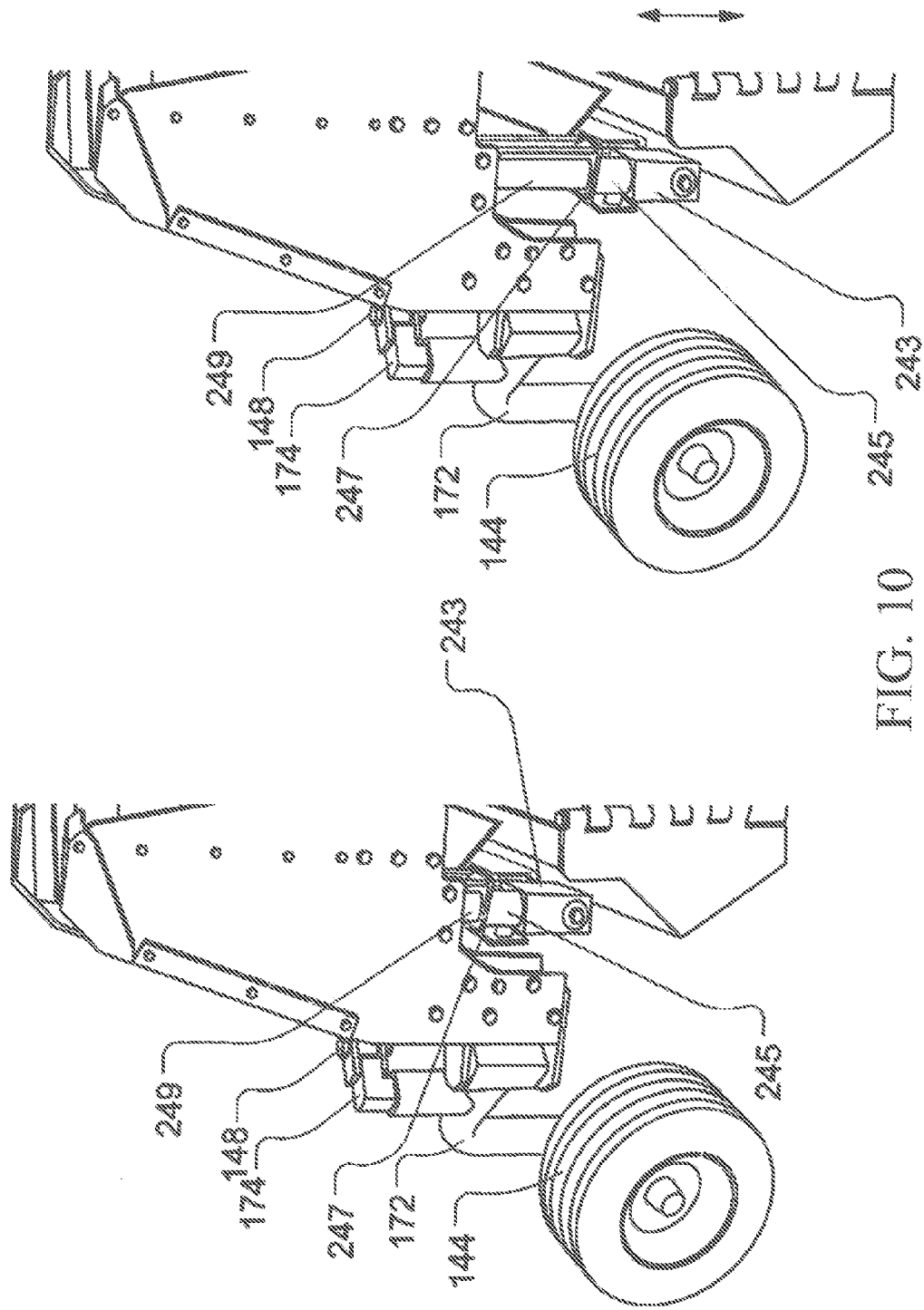
FIG. 10 depicts two perspective views of an assembly configured to raise and lower each end of a blade assembly of the rear mounted grader apparatus of FIGS. 1-9, showing the blade assembly in raised and lowered positions.

As force is applied to one bracket support member 235 by the corresponding actuator 239, the corresponding horizontal support 150 extends or retracts accordingly, allowing blade assembly 190 to rotate around vertical axis 229. This allows blade assembly 190 to be extended, retracted, or pivoted/tilted around a vertical axis by the operator as desired. Again, actuators 227 may be used to selectively position end plates 214 at a desired angle with respect to horizontal center axis 13, and slideable arms 223 may maintain the selected angle of the end plates 214 relative to horizontal center axis 13 regardless of the angle of blade assembly 190. As shown in FIG. 10, the lateral ends of blade assembly 190 can be independently vertically adjusted. Extendable lateral supports 210 (see FIGS. 3a and 8) are disposed horizontally along both ends of blade assembly 190 and are coupled to blade assembly 190 by one or more lateral support brackets 212. Lateral supports 210 may be positioned between exterior panel 198 and exterior top panel 204 (see e.g., FIG. 2). In some examples, lateral supports 210 are mechanical actuators, such as hydraulic cylinders, that can be actuated to extend and retract. The outermost end of each lateral support 210 is received within, or is coupled to, a base 243. Base 243 (FIG. 10) may be positioned between the blade assembly 190 and the trailing wheel 144. Extending upwardly from base 243 is a support 245 with a horizontal plate 247 coupled to its upper surface. A vertical adjustment member 249 extends upwardly from base 243. In some embodiments, vertical adjustment member 249 is a mechanical actuator, such as a hydraulic cylinder, that can be actuated to extend and retract. One end of vertical adjustment member 249 is coupled to an inner/interior surface of side plate 180, and the other end is coupled to base 243 and/or support 245 (see FIGS. 5 and 8). Each lateral end of blade assembly 190 can thus be raised and lowered, independently of the opposite lateral end, by actuating the corresponding vertical adjustment member 249.

Gauges with reference numbers 251 for blade depth reference may be coupled to each side plate 180, proximal to the trailing wheels 144 (FIG. 11). A gauge pointer 253 may be coupled to the blade assembly 190. As the blade assembly 190 is raised or lowered on one side, the corresponding gauge pointer 253 is also raised or lowered to indicate the position of the blade.

Referring again to FIG. 9a, the trailing wheels 144 can be moved toward and away from a horizontal center line 13 of the tractor/inner frame 110 by actuation of the movable lateral supports 210. As lateral supports 210 are extended outwardly, the corresponding bases 243 and side plates 180 are also pushed outward from horizontal center line 13. Because the trailing wheel supports 172 are coupled to the side plates 180, the trailing wheels 144 are also moved away from horizontal center line 13. Similarly, retraction of lateral supports 210 results in the movement of trailing wheel supports 172 toward horizontal center line 13. This configuration allows the trailing wheels to be positioned by the operator of the motor vehicle to trail behind the blade during normal operation or to be extended outwardly from the blade. The trailing wheels may be extended outwardly, for example, to match an existing or established grade (e.g. concrete or AC slab, concrete curbs or gutters, material previously placed by the blade system, and/or another ground reference) using an outside reference.

Turning again to the inner frame 110, a vertical support member 261 may be attached by bolts or other fasteners to medial frame member 118 (FIGS. 2 and 8). Vertical support member 261 may include two plates bolted to the sides of medial frame member 118 and extending upwardly. A control block 263 may be mounted to vertical support member 261. Control block 263 may include one or more hydraulic valves, manifolds, and/or electronic circuitry. Control block 263 may electrically, mechanically, and/or hydraulically connect the control panel 9 to one or more of the above-described actuators, allowing an operator to remotely control and adjust various components of the grading apparatus from the control panel 9. Control block 263 may provide electrical signals and/or motive force for remote independent adjustment of the vertical and horizontal angles of the blade assembly, the angles of the end plates, the lateral and rotary position of the trailing wheels, the extension and retraction of the horizontal supports, and one or more optional components, such as an actuator of a scarifier assembly.

A plurality of couplers (not shown) may be coupled to control block 263 and to any of the actuatable components and control panels/systems described above. For example, at least some of the couplers may be conduits for pressurized hydraulic fluid, (e.g., hydraulic pipes, tubes, or hoses). One or more of the couplers may extend through an enclosed passage defined by the bottom of control block 263, the top of medial frame member 118, and the interior sides of vertical support member 261. Control block 263 may be electronically coupled to apparatus control panel 9 and/or to a hydraulic system of the tractor. Thus, control block 263 may be used by an operator (via apparatus control panel 9) to control and adjust the movable components of grader apparatus 100 as described above.

Optionally, as best shown in FIG. 8, one or more lights, fasteners, or other components may be coupled to support mount 206, support mount brackets 237, or bracket support members 235. For example, one or more fasteners (not shown) may be coupled to support mount brackets 237. The fasteners may include clips or clamps configured to retain one or more hydraulic hoses that convey pressurized hydraulic fluid between the control block 263 and one or more of the above-described actuators (e.g., actuators 146, lateral supports 210, vertical adjustment members 249, actuators 239, actuators 227). The fasteners may be used to support the hydraulic hoses to reduce the risk of damage or interruption of their function from vibrations and/or moving components of the apparatus.

With reference now also to FIGS. 12-15B, a box blade assembly 310 is a known accessory for motor vehicle such as a tractor. A typical box blade assembly 310 consists of a heavy, three-sided box open on the front, top, and bottom sides. The front side may include land-forming tools, such as, scarifiers. A box blade assembly 310 may couple to a tractor 1 via a three-point hitch 21, so that the tractor 1 can drag and manipulate the box blade assembly 310. A box blade assembly 310 may be an off-the-shelf tractor accessory available from various manufactures or a custom accessory in box-blade format. A box blade assembly 310 may be referred to as a box blade 310.

In an alternative embodiment, elements of grader apparatus 100 may be adapted to function as an attachment assembly 300 for a box blade 310. Attachment assembly 300 may support a box blade 310 and allow an operator to adjust and control the box blade 310 in various ways. Attachment 300 accordingly may allow use of a box blade 310 in lieu of (or in addition to) the integrated scarifier assembly and/or blade assembly 190 described elsewhere for embodiments of grader apparatus 100. A box blade 310 may be affixed to, attached to, or installed in attachment 300, for example, by welding. Attachment assembly 300 may be referred to as attachment 300.

With reference to FIG. 12, attachment 300 may include a horizontal support 350 with a proximal end operatively connected to a rear axle of a tractor 1 and a trailing wheel 344 supporting a distal end of support 350. With reference also to FIG. 13, attachment 300 may include a support shaft 352 interconnecting box blade 310 to support 350 between the proximal end and the distal end of support 350. Attachment 300 may include a horizontal actuator 354 that moves horizontal support 350 relative to box blade 310. Horizontal actuator 354 may allow trailing wheel 344 to be selectively positioned by an operator and to trail behind box blade 310 during normal operation or to be extended outwardly from box blade 310. The structural installation of box blade 310 within attachment 300 may include reversibly or permanently attaching box blade 310 to attachment points 356. For example, support shaft 352 or horizontal actuator 354 may include or mount to an attachment point 356 such as a flange that can be bolted or welded to box blade 310 in order to install box blade 310 within attachment 300. A horizontal support 350 may be referred to as a beam 350, and a support shaft 352 may be referred to as a lateral support 352.

Attachment 300 may include or accommodate mechanical, electrical, electronic, hydraulic, and/or other forms of linkage, control, and/or communication between tractor 1 and attachment 300. For example, an attachment 300 including box blade 310 may be reversibly coupled to tractor 1 via a three-point hitch 21 with center arm 25, upper arms 25, link arms 27, and/or lower arms 29. Arms 25, 27, 29 may be moveably coupled to tractor 1, for example, to lift or otherwise manipulate box blade 310 or portions of box blade 310, such as, scarifiers. Hood 358 may cover a box or enclosure that contains and/or protects electrical, electronic, mechanical, and/or hydraulic components of associated with attachment 300.

Attachment 300 may further include a second horizontal support 350 with a proximal end operatively connected to a rear axle of tractor 1; a second trailing wheel 344 supporting a distal end of second support 350; a second support shaft 352 interconnecting box blade 310 to second support 350 between the proximal end and the distal end of second support 350; and a second horizontal actuator 354 that moves second support 350 relative to box blade 310. The second horizontal actuator 354 may allow second trailing wheel 344 to be selectively positioned by an operator to trail behind box blade 310 during normal operation or to be extended outwardly from box blade 310.

In an embodiment, the distal end of horizontal support 350 may include an inwardly angled portion 360 located between trailing wheel 344 and support shaft 352. In an embodiment, support 350 may include two or more horizontal support members 362 arranged in a telescoping configuration with one of the two or more horizontal support members 362 slideably received within another of the two or more horizontal support members 362. As illustrated in FIG. 13, for example, horizontal support 350 includes a first horizontal support member 362A slideably received by a second horizontal support member 362B. This telescoping configuration may permit adjustment of the effective total length of horizontal support 350 and/or the effective distance between tractor 1 and box blade 310, for example.

With reference also to FIG. 14, attachment 300 may further include a vertical actuator 364 coupled to horizontal support 350 and trailing wheel 344. The vertical actuator 364 may be selectively actuable to vertically displace trailing wheel 344 relative to support 350. As shown in FIGS. 14 and 15B, activation of vertical actuator 364 may lift support 350 from a lower position (solid lines) to an elevated position (dashed lines). This vertical displacement may accommodate differences in slope or terrain telegraphed from trailing wheels 344, for example. Attachment 300 may further include a pivot bearing 366 mounted to rear wheel 3 of tractor 1, connecting support 350 to the rear axle of tractor 1. Bearing 366 may be substantially coaxial with the rear axle of tractor 1. Bearing 366 may accommodate rotation of the proximal end of horizontal support 350 coaxial to the lengthwise axis of rear axle of tractor 1 resulting from vertical displacement between lower and upper positions of support 350. An operative connection that includes a bearing 366 may further accommodate a horizontal deflection or rotation (that is, rotation concentric to a vertical axis) of the proximal end of support 350 resulting from horizontal motion of support 350 with respect to the rear axle of tractor 1. Bearing 366 may include or mount to a hub-cap-like disc or plate 368 (FIG. 1) that may be attached to a rim of rear wheel 3, for example, to indirectly connect support 350 to rear axle of tractor 1 via plate 368.

Attachment 300 may further include a second horizontal support 350 with a proximal end operatively connected to a rear axle of the tractor 1; a second trailing wheel 344 supporting a distal end of second horizontal support 350; a second support shaft 352 interconnecting box blade 310 to second horizontal support 350 between the proximal and distal ends of second horizontal support 350; and a second horizontal actuator 354 that moves second horizontal support 350 relative to box blade 310, wherein the second horizontal actuator 354 allows second trailing wheel 344 to be selectively positioned by an operator to trail behind the box blade 310 during normal operation or to be extended outwardly from the box blade 310; and a second vertical actuator 364 coupled to second horizontal support 350 and second trailing wheel 344, the second vertical actuator 364 selectively actuable to vertically displace the second trailing wheel 344 relative to the second horizontal support 350.

In an embodiment, support shaft 352 and second support shaft 352 may allow rotation of the horizontal support 350 and the second horizontal support 350 relative to box blade 310, along an axis generally perpendicular to the rear axle of tractor 1. This allowed rotation may accommodate change in angle between horizontal support 350 and box blade 310. For example, as shown in FIGS. 13 and 15A, horizontal actuators 354 may pull (or push) horizontal supports 350 from one horizontal position (solid lines) to another horizontal position (dashed lines). The transition from one position to another position may introduce an angle between a horizontal support 350 and center line 370 and thereby introduce a rotation between a support shaft 352 and the corresponding support 350.

Attachment 300 may further include a pivot bearing 366 mounted to a rear wheel 3 of tractor 1, connecting horizontal support 350 to the rear axle of the tractor 1; and a second pivot bearing 366 mounted to a second rear wheel of the tractor 1, connecting the second horizontal support 350 to the rear axle of tractor 1. As described above, an operative connection that includes pivot bearings 366 may accommodate rotation and/or deflection of horizontal supports 350 at the rear axle resulting from vertical and/or horizontal displacements of horizontal supports 350.

A support system 400 for a box blade 310 attached to a tractor 1 may include a pivot bearing 366 operatively connected to a wheel 3 of tractor 1, a horizontal support 350 extending from pivot bearing 366 to a distal end, and a trailing wheel 344 movably connected to the distal end of horizontal support 350. Support system 400 may further include a horizontal actuator 354 interconnecting horizontal support 350 to the box blade 310, wherein horizontal actuator 354 allows trailing wheel 344 to be selectively positioned by an operator to trail behind box blade assembly 310 during normal operation or to be extended outwardly from box blade assembly 310. Support system 400 may further include a support shaft 352 interconnecting the box blade assembly 310 to horizontal support 350 between the proximal end and the distal end of horizontal support 350, in addition to horizontal actuator 354.

Support system 400 may further include a second pivot bearing 366 operatively connected to a second wheel 3 of a tractor 1; a second horizontal support 350 extending from the second pivot bearing 366 to a distal end; and a second trailing wheel 344 movably connected to the distal end of second horizontal support 350. Support system 400 may further include a second horizontal actuator 354 interconnecting second horizontal support 350 to box blade 310, wherein the second horizontal actuator 354 allows the second trailing wheel 344 to be selectively positioned by an operator to trail behind the box blade assembly 310 during normal operation or to be extended outwardly from the box blade assembly 310.

In an embodiment, the distal end of horizontal support 350 may include an inwardly angled portion 360 located between trailing wheel 344 and horizontal actuator 354. In an embodiment, horizontal support 350 may include two or more horizontal support members 362 arranged in a telescoping configuration with one of the two or more horizontal support members 362 slideably received within another of the two or more support members 362. In an embodiment, support system 400 may further include a vertical actuator 364 coupled to horizontal support 350 and trailing wheel 344, the vertical actuator 364 selectively actuable to vertically displace trailing wheel 344 relative to horizontal support 350.

Support system 400 may further include a second pivot bearing 366 operatively connected to a second wheel 3 of a tractor 1, a second horizontal support 350 extending from the second pivot bearing 366 to a distal end, and a second trailing wheel 344 movably connected to the distal end of second horizontal support 350. Support system 400 may further include a second horizontal actuator 354 interconnecting second horizontal support 350 to box blade 310, wherein the second horizontal actuator 354 allows the second trailing wheel 344 to be selectively positioned by an operator to trail behind the box blade assembly 310 during normal operation or to be extended outwardly from the box blade assembly 310; and a second vertical actuator 364 coupled to second horizontal support 350 and second trailing wheel 344, the second vertical actuator selectively actuable to vertically displace second trailing wheel 344 relative to second horizontal support 350. In an embodiment, horizontal actuator 354 and second horizontal actuator 354 allow rotation of horizontal support 350 and second horizontal support 350 relative to box blade 310, along an axis generally parallel to a rear axle of tractor 1.

A method of providing different reference points for a box blade 310 connected to a tractor 1 may include several steps. The steps may include supporting a proximal end of a beam 350 on a wheel 3 of a tractor 1 and supporting a distal end of beam 350 on a trailing wheel 344. Wheel 3 and trailing wheel 344 provide reference points, as the wheels roll along the ground.

The steps may also include coupling beam 350 to a box blade 310 through an extendable lateral support 352 including a horizontal mechanical actuator 354 that can be actuated to extend and retract, thereby moving beam 350 relative to box blade 310. This effectively moves box blade 310 relative to the reference points defined by wheel 3 and trailing wheel 344. Another step includes selectively positioning trailing wheel 344 to move toward and away from a horizontal center line 370 of a tractor 1 by actuation of the horizontal mechanical actuator 354. As shown in FIGS. 13 and 15A, trailing wheel 344 accordingly may be moved to allow trailing wheel 344 to be positioned to trail behind box blade 310 during normal operation or to be extended outwardly from box blade 310. This may result in different effective heights of a corresponding portion of box blade 310, if there is a height difference when comparing the underlying ground immediately behind box blade 310 to the underlying ground that is located outwardly from box blade 310. Typically, the ground immediately behind box blade 310 will be more level that the ground that is located outwardly from box blade 310.

The method may further include supporting a proximal end of a second beam 350 on a second wheel 3 of tractor 1; supporting a distal end of second beam 350 on a second trailing wheel 344; coupling second beam 350 to box blade 310 through a second extendable lateral support 352 including a second horizontal mechanical actuator 354 that can be actuated to extend and retract, thereby moving beam 350 relative to box blade 310; and selectively positioning trailing wheel 344 to move toward and away from a horizontal center line 370 of a tractor 1 by actuation of the horizontal mechanical actuator 354. Trailing wheel 344 accordingly may be moved to allow trailing wheel 344 to be positioned to trail behind box blade 310 during normal operation or to be extended outwardly from box blade 310.

The method may further include providing a vertical actuator 364 coupled to the distal end of beam 350 and selectively actuating vertical actuator 364 to vertically displace trailing wheel 344 relative to beam 350.

The method may further include supporting a proximal end of a second beam 350 on a second wheel 3 of tractor 1; supporting a distal end of second beam 350 on a second trailing wheel 344; coupling second beam 350 to box blade 310 through a second extendable lateral support 352 including a second horizontal mechanical actuator 354 that can be actuated to extend and retract, thereby moving beam 350 relative to box blade 310. The method may further include selectively positioning trailing wheel 344 to move toward and away from a horizontal center line 370 by actuation of horizontal mechanical actuator 354. Trailing wheel 344 accordingly may be moved to allow trailing wheel 344 to be positioned to trail behind box blade 310 during normal operation or to be extended outwardly from box blade 310. The method may further include providing a second vertical actuator 364 coupled to the distal end of the second beam 350 and selectively actuating second vertical actuator 364 to vertically displace second trailing wheel 344 relative to second beam 350.

The method may further include providing a plate 368 sized to fit snugly within a rim of the wheel 3 of tractor 1; fixing plate 368 to the rim of wheel 3; mounting a pivot bearing 366 to plate 368 generally coaxial with wheel 3; and coupling the proximal end of beam 350 to pivot bearing 366, thereby supporting the proximal end of beam 350 on wheel 3 of tractor 1. The method may further include providing a second plate 368 sized to fit snugly within a rim of a second wheel 3; fixing second plate 368 to the rim of second wheel 3; mounting a second pivot bearing 366 to second plate 368 generally coaxial with second wheel 3; and coupling the proximal end of second beam 350 to second pivot bearing 366, thereby supporting the proximal end of second beam 350 on second wheel 3.

The method may further include providing a plate 368 sized to fit snugly within a rim of wheel 3 of tractor 1; fixing the plate 368 to the rim of wheel 3; mounting a pivot bearing 366 to plate 368 generally coaxial with wheel 3; and coupling the proximal end of beam 350 to pivot bearing 366, thereby supporting the proximal end of beam 350 on wheel 3 of tractor 1.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An attachment for A tractor with a movable box blade assembly comprising:
    a left rear wheel and a right rear wheel, mounted at distal ends of a rear axle;
    a three-point hitch attached to the tractor, adjacent to and between the left rear wheel and the right rear wheel;
    a box blade assembly attached to the three-point hitch;
    a left horizontal support with a proximal end operatively connected to the rear axle adjacent the left rear wheel;
    a left trailing wheel supporting a distal end of the left horizontal support, distal from the proximal end of the left horizontal support;
    a left extendable support shaft interconnecting the box blade assembly to the left horizontal support between the proximal end and the distal end of the left horizontal support;
    a left horizontal actuator that extends and retracts the left extendable support shaft to move the left horizontal support relative to the box blade assembly, wherein the left horizontal actuator allows the left trailing wheel to be selectively positioned by an operator to trail behind the box blade assembly during normal operation or to be extended outwardly to the left from the box blade assembly;
    a right horizontal support with a proximal end operatively connected to the rear axle adjacent the right rear wheel;
    a right trailing wheel supporting a distal end of the right horizontal support, distal from the proximal end of the right horizontal support;
    a right extendable support shaft interconnecting the box blade assembly to the right horizontal support between the proximal end and the distal end of the right horizontal support;
    a right horizontal actuator that extends and retracts the right extendable support shaft to move the right horizontal support relative to the box blade assembly, wherein the right horizontal actuator allows the right trailing wheel to be selectively positioned by an operator to trail behind the box blade assembly during normal operation or to be extended outwardly to the right from the box blade assembly.

2. The attachment according to claim 1, wherein the distal end of the left horizontal support includes an inwardly angled portion located between the left trailing wheel and the left support shaft, adjacent the left trailing wheel.

3. The attachment according to claim 1, wherein the distal end of the right horizontal support includes an inwardly angled portion located between the right trailing wheel and the right support shaft, adjacent the right trailing wheel.

4. The attachment according to claim 1, wherein the left horizontal support comprises two or more horizontal support members arranged in a telescoping configuration with one of the two or more left horizontal support members slideably received within another of the two or more left horizontal support members; and the right horizontal support comprises two or more right horizontal support members arranged in a telescoping configuration with one of the two or more right horizontal support members slideably received within another of the two or more right horizontal support members.

5. The attachment according to claim 1, further comprising a left vertical actuator coupled to the left horizontal support and the left trailing wheel, the left vertical actuator selectively actuable to vertically displace the left trailing wheel relative to the left horizontal support; and a right vertical actuator coupled to the right horizontal support and the right trailing wheel, the right vertical actuator selectively actuable to vertically displace the right trailing wheel relative to the right horizontal support.

6. The attachment according to claim 5, further comprising a left pivot bearing mounted to the left rear wheel of the tractor, connecting the left horizontal support to the rear axle of the tractor; and a right pivot bearing mounted to the right rear wheel of the tractor, connecting the right horizontal support to the rear axle of the tractor, wherein the left pivot bearing is generally coaxial with the left rear wheel, and the right pivot bearing is generally coaxial with the right rear wheel.

7. The attachment according to claim 1, wherein the left extendable support shaft is generally coaxial with the left horizontal actuator; and the right extendable support shaft is generally coaxial with the right horizontal actuator.

8. The attachment according to claim 7, wherein the left extendable support shaft is coaxially rotatable relative to the left horizontal actuator; and the right extendable support shaft is coaxially rotatable relative to the right horizontal actuator; thereby allowing rotation of the left horizontal support and the right horizontal support relative to the box blade assembly, along an axis generally parallel to the rear axle of the tractor.

9. The attachment according to claim 7, further comprising:
    a left pivot bearing mounted to the left rear wheel of the tractor, connecting the left horizontal support to the rear axle of the tractor; and
    a right pivot bearing mounted to the right rear wheel of the tractor, connecting the right second horizontal support to the rear axle of the tractor;
    wherein the left pivot bearing is generally coaxial with the left rear wheel, and the right pivot bearing is generally coaxial with the right rear wheel.

10. A support system for a box blade attached to a tractor, comprising:
    a first pivot bearing;
    a first mount connected to the first pivot bearing, the first mount sized to be operatively connected to a first rear wheel of a tractor so that the first pivot bearing is generally coaxial with the first rear wheel;
    a first horizontal support extending from the first pivot bearing to a first distal end;
    a first trailing wheel movably connected to the first distal end of the first horizontal support;
    a box blade assembly;
    a first horizontal actuator interconnecting the first horizontal support to the box blade assembly, wherein the first horizontal actuator allows the first trailing wheel to be selectively positioned by an operator to trail behind the box blade assembly during normal operation or to be extended outwardly from the box blade assembly;
    a second pivot bearing;
    a second mount connected to the second pivot bearing, the second mount sized to be operatively connected to a second rear wheel of a tractor so that the second pivot bearing is generally coaxial with the second rear wheel;

a second horizontal support extending from the second pivot bearing to a second distal end;

a second trailing wheel movably connected to the second distal end of the second horizontal support;

a second horizontal actuator interconnecting the second horizontal support to the box blade assembly, wherein the second horizontal actuator allows the second trailing wheel to be selectively positioned by an operator to trail behind the box blade assembly during normal operation or to be extended outwardly from the box blade assembly.

11. The support system according to claim 10, further comprising a first support shaft interconnecting the box blade assembly to the first horizontal support between the first proximal end and the first distal end of the first horizontal support, in addition to the first horizontal actuator; and a second support shaft interconnecting the box blade assembly to the second horizontal support between the second proximal end and the second distal end of the second horizontal support, in addition to the second horizontal actuator.

12. The support system according to claim 11, further comprising:

a first extendable support shaft interconnecting the box blade assembly to the first horizontal support between the proximal end and the distal end of the first horizontal support;

wherein the first horizontal actuator extends and retracts the first extendable support shaft to move the first horizontal support relative to the box blade assembly, and allows the first trailing wheel to be selectively positioned by an operator to trail behind the box blade assembly during normal operation or to be extended outwardly from the box blade assembly; and a second extendable support shaft interconnecting the box blade assembly to the second horizontal support between the proximal end and the distal end of the second horizontal support;

wherein the second horizontal actuator extends and retracts the second extendable support shaft to move the second horizontal support relative to the box blade assembly, and allows the second trailing wheel to be selectively positioned by an operator to trail behind the box blade assembly during normal operation or to be extended outwardly from the box blade assembly.

13. The support system according to claim 10, wherein the distal end of the first horizontal support includes a first inwardly angled portion located between the first trailing wheel and the first horizontal actuator, and the distal end of the second horizontal support includes a second inwardly angled portion located between the second trailing wheel and the second horizontal actuator.

14. The support system according to claim 10, wherein the first horizontal support comprises two or more horizontal support members arranged in a telescoping configuration with one of the two or more horizontal support members slideably received within another of the two or more horizontal support members.

15. The support system according to claim 10, further comprising a first vertical actuator coupled to the first horizontal support and the first trailing wheel, the first vertical actuator selectively actuable to vertically displace the first trailing wheel relative to the first horizontal support.

16. The support system according to claim 15, further comprising:

a first extendable support shaft interconnecting the box blade assembly to the first horizontal support between the proximal end and the distal end of the first horizontal support;

wherein the first horizontal actuator extends and retracts the first extendable support shaft to move the first horizontal support relative to the box blade assembly, and allows the first trailing wheel to be selectively positioned by an operator to trail behind the box blade assembly during normal operation or to be extended outwardly from the box blade assembly; and a second extendable support shaft interconnecting the box blade assembly to the second horizontal support between the proximal end and the distal end of the second horizontal support;

wherein the second horizontal actuator extends and retracts the second extendable support shaft to move the second horizontal support relative to the box blade assembly and allows the second trailing wheel to be selectively positioned by an operator to trail behind the box blade assembly during normal operation or to be extended outwardly from the box blade assembly.

17. The support system according to claim 16, wherein the first horizontal actuator and the second horizontal actuator allow rotation of the first horizontal support and the second horizontal support relative to the box blade, along an axis generally parallel to a rear axle of the tractor.

18. A method of providing different reference points for a box blade connected to a tractor, comprising the steps of:

connecting a box blade to a tractor using a three-point hitch;

supporting a left proximal end of a left beam on a left wheel of a tractor;

supporting a left distal end of the left beam on a left trailing wheel;

coupling the left beam to the box blade through a left extendable lateral support including a left horizontal mechanical actuator that can be actuated to extend and retract, thereby moving the left beam relative to the box blade;

selectively positioning the left trailing wheel to move toward and away from a horizontal center line of a tractor by actuation of the left horizontal mechanical actuator, wherein the left trailing wheel may be moved inwardly to the right to allow the trailing wheel to be positioned to trail behind the box blade during normal operation or to be extended outwardly to the left from the box blade;

supporting a right proximal end of a right beam on a right wheel of a tractor;

supporting a right distal end of the right beam on a right trailing wheel;

coupling the right beam to the box blade through a right extendable lateral support including a right horizontal mechanical actuator that can be actuated to extend and retract, thereby moving the right beam relative to the box blade; and selectively positioning the right trailing wheel to move toward and away from a horizontal center line of a tractor by actuation of the right horizontal mechanical actuator, wherein the right trailing wheel may be moved inwardly to the left to allow the trailing wheel to be positioned to trail behind the box blade during normal operation or to be extended outwardly to the right from the box blade.

19. The method of providing different reference points for a box blade connected to a tractor, according to claim 18, further comprising the steps of:
- mounting the left extendable lateral support shaft to be generally coaxial with the left horizontal actuator; and
- mounting the right extendable support shaft to be generally coaxial with the right horizontal actuator; and
- wherein the left horizontal actuator and the right horizontal actuator allow rotation of the left beam and the right beam relative to the box blade, along an axis generally parallel to a rear axle of the tractor.

20. The method of providing different reference points for a box blade connected to a tractor, according to claim 18, further comprising the step of providing a left vertical actuator coupled to the left distal end of the left beam and selectively actuating the left vertical actuator to vertically displace the left trailing wheel relative to the left beam; and providing a right vertical actuator coupled to the right distal end of the right beam and selectively actuating the right vertical actuator to vertically displace the right trailing wheel relative to the right beam.

21. The method of providing different reference points for a box blade connected to a tractor, according to claim 20, further comprising the steps of:
- arranging two left horizontal support members in a telescoping configuration with one of the two left horizontal support members slideably received within another of the two left horizontal support members, to define the left beam; and
- arranging two right horizontal support members in a telescoping configuration with one of the two right horizontal support members slideably received within another of the two right horizontal support members, to define the right.

22. The method of providing different reference points for a box blade connected to a tractor, according to claim 20, further comprising the steps of:
- providing a left plate sized to fit snugly within a rim of the left wheel of the tractor;
- fixing the left plate to the rim of the left wheel of the tractor;
- mounting a left pivot bearing to the left plate generally coaxial with the left wheel of the tractor;
- coupling the left proximal end of the left beam to the left pivot bearing, thereby supporting the left proximal end of the left beam on the left wheel of the tractor;
- providing a right plate sized to fit snugly within a rim of the right wheel of the tractor;
- fixing the second plate to the rim of the second wheel of the tractor;
- mounting a second pivot bearing to the second plate generally coaxial with the second wheel of the tractor; and
- coupling the proximal end of the second beam to the second pivot bearing, thereby supporting the proximal end of the second beam on the second wheel of the tractor.

23. The method of providing different reference points for a box blade connected to a tractor, according to claim 18, further comprising the steps of:
- providing a left plate sized to fit snugly within a rim of the left wheel of the tractor;
- fixing the left plate to the rim of the left wheel of the tractor;
- mounting a left pivot bearing to the left plate generally coaxial with the left wheel of the tractor;
- coupling the left proximal end of the left beam to the left pivot bearing, thereby supporting the left proximal end of the left beam on the left wheel of the tractor;
- providing a right plate sized to fit snugly within a rim of the right wheel of the tractor;
- fixing the right plate to the rim of the right wheel of the tractor;
- mounting a right pivot bearing to the right plate generally coaxial with the right wheel of the tractor; and
- coupling the right proximal end of the right beam to the right pivot bearing, thereby supporting the right proximal end of the right beam on the right wheel of the tractor.

* * * * *